US012607339B2

(12) United States Patent
Portinga et al.

(10) Patent No.: US 12,607,339 B2
(45) Date of Patent: Apr. 21, 2026

(54) LIGHTING DEVICE ASSEMBLY WITH HEAT SINK

(71) Applicant: Troy-CSL Lighting, Inc., City of Industry, CA (US)

(72) Inventors: Joshua James Portinga, Chino Hills, CA (US); Jacob Benjamin Hawkins, Diamond Bar, CA (US)

(73) Assignee: Troy-CSL Lighting, Inc., City of Industry (CA)

( * ) Notice: Subject to any disclaimer, the term of this patent is extended or adjusted under 35 U.S.C. 154(b) by 62 days.

(21) Appl. No.: 18/754,154

(22) Filed: Jun. 26, 2024

(65) Prior Publication Data

US 2026/0002663 A1 Jan. 1, 2026

(51) Int. Cl.

| | |
|---|---|
| ***F21V 29/503*** | (2015.01) |
| ***F21S 8/02*** | (2006.01) |
| ***F21V 19/02*** | (2006.01) |
| ***F21V 21/04*** | (2006.01) |
| ***F21V 29/89*** | (2015.01) |

(52) U.S. Cl.

CPC ............ *F21V 29/503* (2015.01); *F21S 8/026* (2013.01); *F21V 19/02* (2013.01); *F21V 21/047* (2013.01); *F21V 29/89* (2015.01)

(58) Field of Classification Search

CPC ........ F21V 29/503; F21V 29/89; F21V 19/02; F21V 21/047; F21S 8/026

See application file for complete search history.

(56) References Cited

U.S. PATENT DOCUMENTS

2021/0247060 A1* 8/2021 Boogaard ............. F21S 41/141

FOREIGN PATENT DOCUMENTS

EP 3521688 B1 * 8/2021 .............. F21V 14/02

* cited by examiner

*Primary Examiner* — Anne M Hines
*Assistant Examiner* — Jose M Diaz
(74) *Attorney, Agent, or Firm* — Foley & Lardner LLP

(57) ABSTRACT

A lighting device assembly includes an optic assembly having a light source, a housing having a cavity in which the at least a portion of the optic assembly is received, the housing is configured to secure the lighting device assembly to a wall, a ceiling, or a surface, and a heat sink configured to couple the optic assembly to an opening of the housing that defines the cavity. The heat sink includes a hinged aiming mechanism configured to movably couple the optic assembly to the housing to allow the light source to move relative to the housing.

16 Claims, 24 Drawing Sheets

Section D-D

LIGHTING DEVICE ASSEMBLY WITH HEAT SINK

BACKGROUND

Certain lighting devices such as, but not limited to, room or area lighting devices, can include configurations that allow for mounting of the lighting device in a recess in a ceiling, wall, or another structure. In certain contexts, it can be desirable to mount the lighting device assembly behind a panel of the ceiling, wall, or another structure, and reduce or minimize the size of an opening through the panel for passing light from the lighting device.

Lighting devices include a light source, such as a Light Emitting Diode (LED). Typically, the brightness of an LED light source is at least partially related to the speed in which heat can be transferred away from the LED component. For example, it can be desirable to maintain the temperature of the LED under about 105° Celsius for improved or maximum light output and efficiency. However, in contexts in which the lighting device is mounted in a ceiling, wall or other object (as in the case of a recessed lighting device), the LED component can be located within an enclosed or poorly ventilated environment within the ceiling, wall or other object, which can inhibit the ability to transfer heat away from the LED. In addition, in contexts in which the lighting device is mounted in a ceiling, wall or other object (as in the case of a recessed lighting device), it can be desirable to provide access to components of the lighting device, during or after mounting the lighting device, e.g., in a plenum, attic space, wall space or other volume space in the ceiling, wall or other object.

SUMMARY

Various lighting device and system examples described herein provide efficient transfer and dissipation of heat away from the LED and other heat generating components such as the driver for the LED, ease of accessibility to components located in a ceiling, wall or other object, ability to mount components and pass light through a relatively small opening in a ceiling, wall or other object, and ease of assembling, installation, dissembling, and removal of the lighting device and system.

In some embodiments, a lighting device assembly includes an optic assembly having a light source, a housing having a cavity in which the at least a portion of the optic assembly is received, the housing is configured to secure the lighting device assembly to a wall, a ceiling, or a surface, and a heat sink configured to couple the optic assembly to an opening of the housing that defines the cavity. The heat sink includes a hinged aiming mechanism configured to movably couple the optic assembly to the housing to allow the light source to move relative to the housing.

In some embodiments, a lighting device assembly includes an optic assembly including a light source, a housing including a cavity in which the at least a portion of the optic assembly is received, the housing is configured to secure the lighting device assembly to a wall, a ceiling, or a surface, a heat sink composed of a sheet metal, the heat sink is configured to couple the optic assembly to an opening of the housing that defines the cavity, wherein a thickness of at least a portion of the heat sink is at least 3 mm. The heat sink includes a first bracket supporting a first rotational of the optic assembly relative to the housing and a second bracket supporting a second rotational movement of the optic assembly relative to the housing.

In some embodiments, a method for providing a lighting device assembly includes providing a first bracket and a second bracket of a heat sink using sheet metal, wherein a portion of the sheet metal has a thickness of at least 3 mm, rotatably supporting the first bracket on the second bracket, rotatably support the second bracket on a housing of the lighting device assembly, and attaching an optic assembly comprising a light source to the first bracket.

BRIEF DESCRIPTION OF THE DRAWINGS

The above and other aspects and features of the present invention will become more apparent to those skilled in the art from the following detailed description of the example embodiments with reference to the accompanying drawings, in which.

DETAILED DESCRIPTION

Figure 1A:
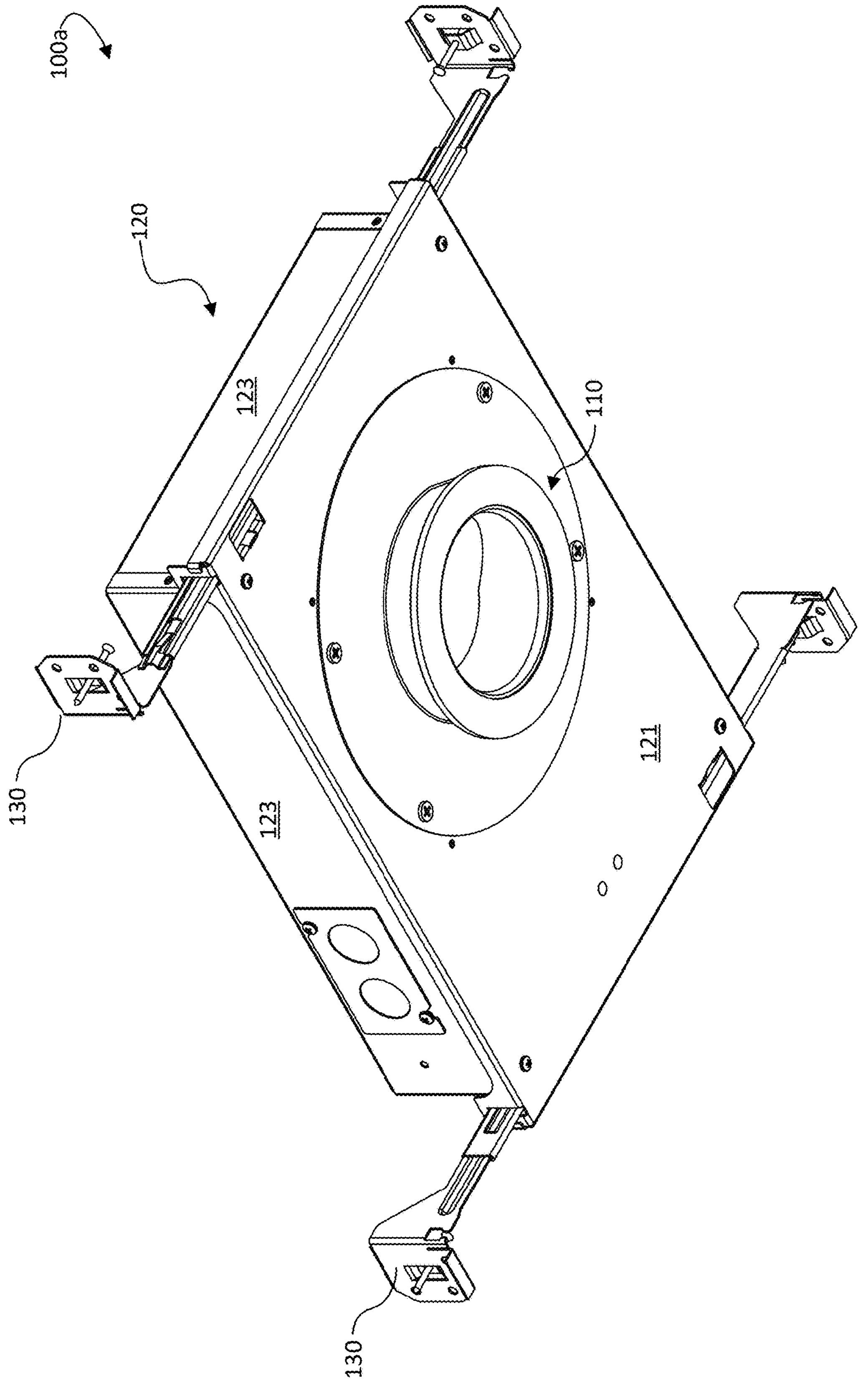
FIG. 1A is a front perspective view of an example of a lighting device assembly, according to various embodiments.

Hereinafter, example embodiments will be described in more detail with reference to the accompanying drawings. The present invention, however, can be embodied or arranged in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention cannot be described. Unless otherwise noted, like reference numerals denote like elements throughout the attached drawings and the written description, and thus, descriptions thereof cannot be repeated. Further, features or aspects within each example embodiment should typically be considered as available for other similar features or aspects in other example embodiments.

According to various examples described herein, a lighting device assembly or system is configured as a concealed or a recessed lighting device for mounting in a ceiling, wall, surface, or another structure, by locating at least a portion of the lighting device assembly within or behind a ceiling panel, wall panel, or another structure. For example, the lighting device assembly can be configured to be installed in an opening to a plenum, duct or attic space of a ceiling, or in an inner wall space in a manner to appear flush or substantially flush with an exposed surface of a ceiling, wall, or another object. In other examples, variations of the lighting device assembly can be configured to be installed in a manner that is not flush with an exposed surface (and, instead, are configured to be recessed in or protruding from the exposed surface of a ceiling, wall, outer housing, or another object), or is configured to be surface-mounted on the exposed surface of the ceiling, wall, outer housing or other object. In yet other examples, variations of the lighting device assembly can be configured to be mounted on a support structure (such as, but not limited to a sconce structure, pedestal, shaft or the like).

The lighting device assembly includes a lighting device module (e.g., an optic assembly) having at least one light source for generating light and at least one optic member that are configured to emit the light in a cone or another pattern. In examples in which an optic member includes one or more lenses, the axis of the light emission can correspond to an optical axis of the one or more lenses. In other examples, the axis of the light emission can correspond to a center of the light cone or pattern emitted by the light source and optic member.

For downlight fixtures in which the lighting device assembly is arranged in a ceiling, a compact and shallow design is preferred in some scenarios. A compact and shallow design allows the lighting device assembly to be installed in confined spaces, such as beneath air ducts and within the cavity of slender joists. Such lighting device assemblies frequently encounter overheating issues in the housing, the lighting source (e.g., the LED), and the driver. For example, under safety standards such as Underwriters Laboratories (UL) safety standards, the housing temperature should not exceed 90 degrees Celsius. Furthermore, the lighting source and driver must be maintained below their respective maximum rated operating temperatures to prevent premature failure. To mitigate these challenges, some conventional lighting device assemblies incorporate large, finned heat sinks to maximize heat dissipation. The finned heat sink designs increase both the manufacturing cost and the overall size of the lighting device assembly. Some conventional lighting device assemblies mount the light source directly to a housing cover which functions as a large flat heat sink for the light source. Such configuration fixes the light source in place without allowing the light source to move to aim the light.

Some implementations of lighting device assemblies described herein are configured to provide sufficient thermal communication and heat dissipation characteristics to facilitate with maintaining the temperature of the light source, housing, and driver at or below a desired threshold temperatures for improved operation. In addition to thermal communication, the lighting device assemblies described herein can be configured for ease of manufacture, assembly, or servicing. In some examples, the lighting device assemblies described herein can be configured to allow adjustment of a direction of light emission from the lighting module about multiple axes. For example, a light device assembly as described herein has improved the utility, reduced manufacturing costs, and can withstand the high-temperature environment of an insulated space such as a ceiling or a wall.

In some examples, the lighting device assembly can be configured to emit light through a relatively small opening in a panel (e.g., a base member), where that relatively small opening has a size and shape through which the lighting device module and the driver electronics can fit, for example, by installing or removing those components in or from the rest of the lighting device assembly. Accordingly, a single, relatively small opening can provide a light outlet opening, and also accommodate selective access to the lighting device module and (or) the driver electronics, without requiring removal of the rest of the lighting device assembly from an installed state.

In some examples, a light device assembly includes a metal support structure configured to structurally support the light source, the metal support element functioning as both a heat sink for dissipating heat of the light source and a hinged aiming mechanism for aiming the light source at a particular direction. In some examples, the support structure includes at least one sheet metal which can be made from a suitable metal such as aluminum. In some examples, for improved functioning as a heat sink, the metal support element has a thickness that is 3 mm, greater than 2 mm, greater than 3 mm, between 2 mm-6 mm, or between 2.75-3.25 mm.

In some examples, heat from the light source is first dispersed over a large surface area of a first bracket (also referred to as a main bracket) of the support structure, which radiates such heat from the light source into the cavity or interior of the housing. The first bracket also transfer conducts heat from the light source through one or more side portions (e.g., hinge members) to a second bracket (also referred to as a rotating base bracket). The support structure, including both the first and second brackets is composed of or made from aluminum (e.g., 6061 aluminum, metal alloys containing not less than 70% aluminum, metal alloys containing not less than 70% copper, etc.), which is an excellent thermal conductor. In some examples, at least a portion of the support structure (e.g., at least a portion of each of the first bracket or the second bracket) has a thermal conductivity of at least 80 W/MK or at least 152 W/MK. In some examples, the second bracket is mounted on or contacting a large surface area on a front side of the housing, allowing heat to be conducted through the front side of the housing to a ceiling panel, wall panel, or another structure (e.g., a gypsum board), to be dissipated into the space for which the light source is illuminating. Given that panels such as gypsum boards have a thermal resistance R value of 0.56, panels are significantly better thermal conductor than attic insulation, which typically has an R value of 30 or more.

The support structure or heat sink is composed of, or made or constructed from a sheet metal material, which can be formed using sheet forming techniques. Such a heat sink has improved cost-effectiveness and lighter weight as compared to other heat sink designs such as finned heat sinks. Moreover, a support structure has a simple, compact mechanism that enables the light source to be aimed without affixing the LED to the roof (or back side) of the lighting device assembly.

In some examples, to further improve heat dissipation, a driver for driving the light source is mounted on another metal sheet (e.g., a thick piece of aluminum) at the back side of the housing. The heat from the driver can be transferred via that metal sheet to the housing via conduction, and the housing can dissipate the heat into the space for which the light source is illuminating, either directly or via the wall (e.g., the drywall) into the space for which the light source is illuminating.

Lighting Device Assembly 100*a*

Figure 1B:
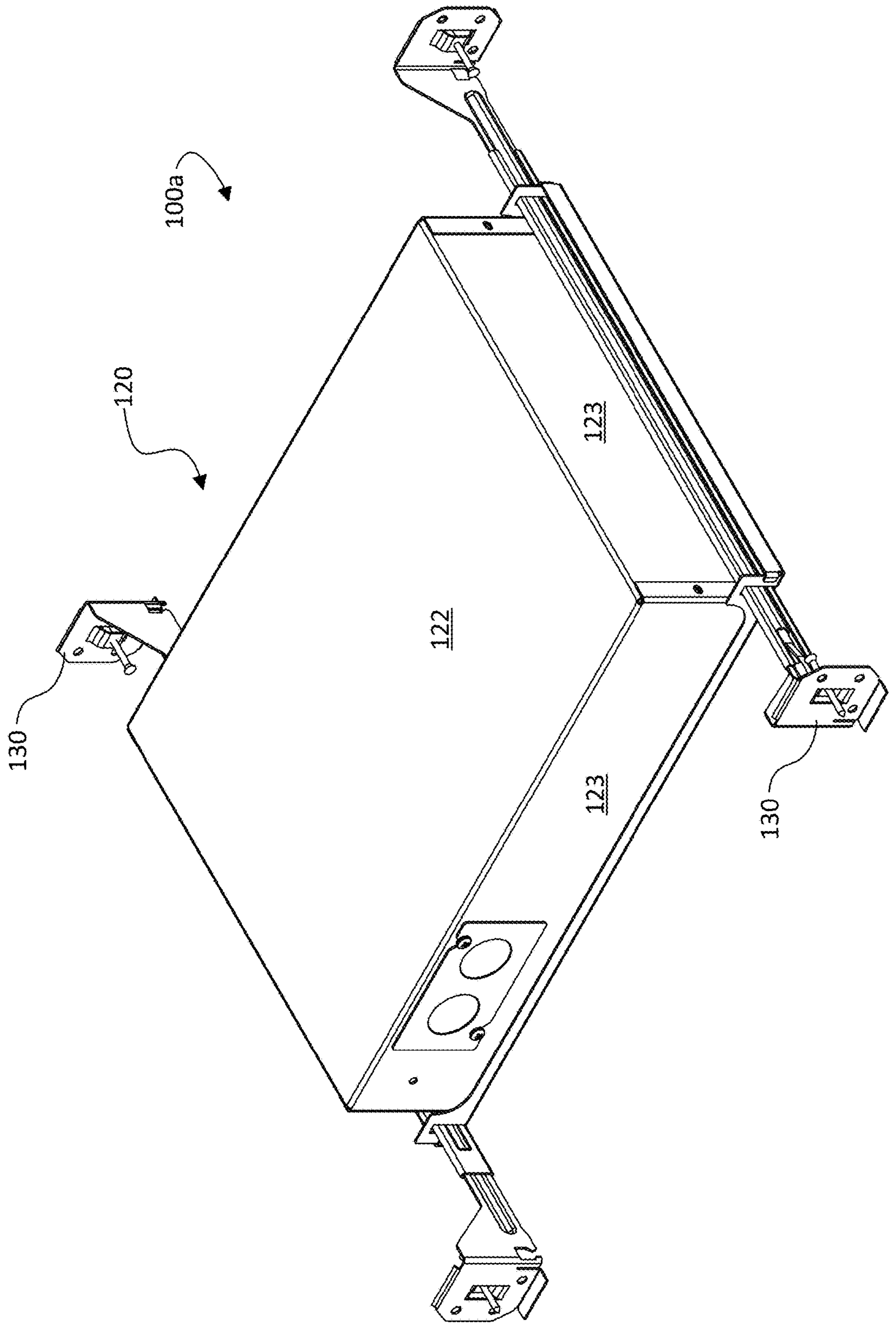
FIG. 1B is a back perspective view of an example of a lighting device assembly, according to various embodiments.
Figure 1C:
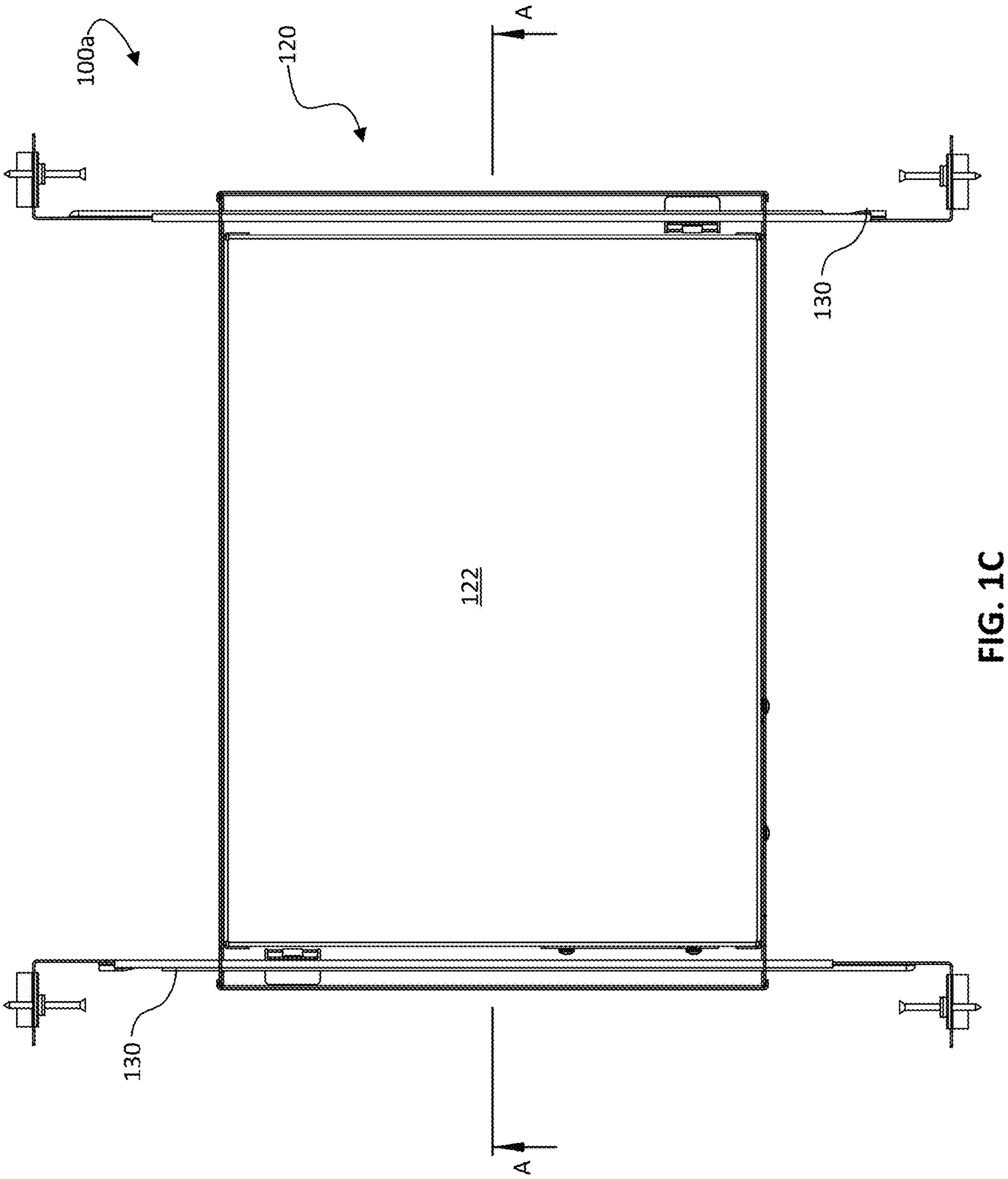
FIG. 1C is a back view of an example of the lighting device assembly, according to various embodiments.
Figure 1D:
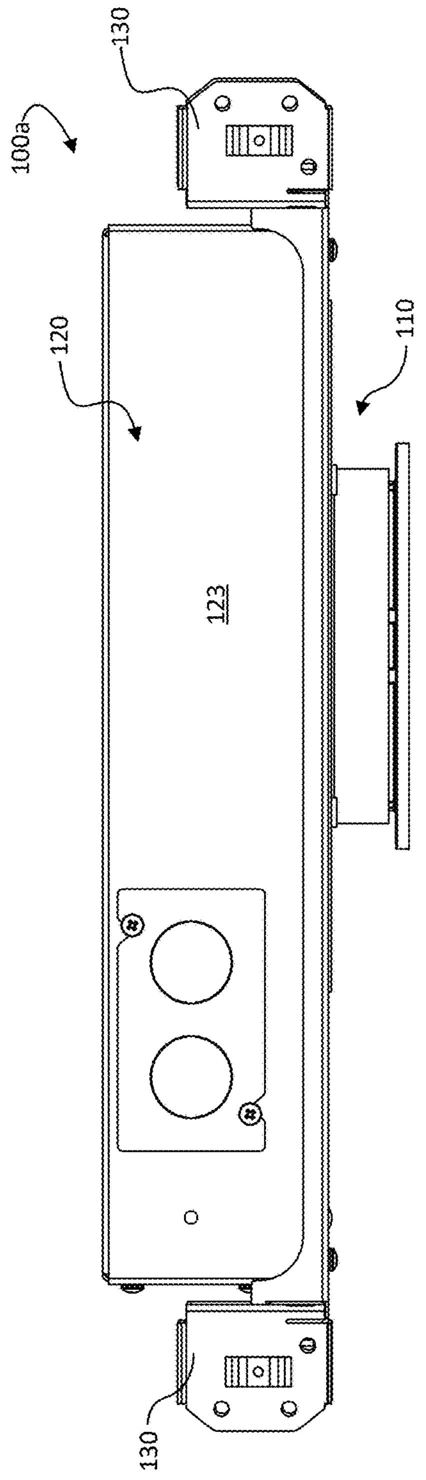
FIGS. 1D and 1E are side views of an example of the lighting device assembly, according to various embodiments.
Figure 1E:
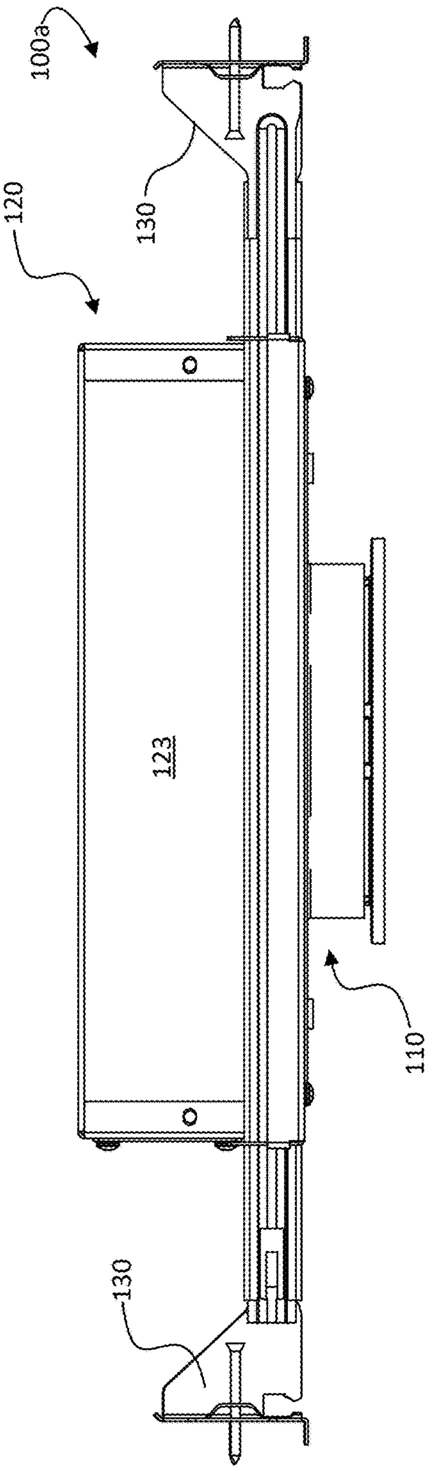
Figure 1F:
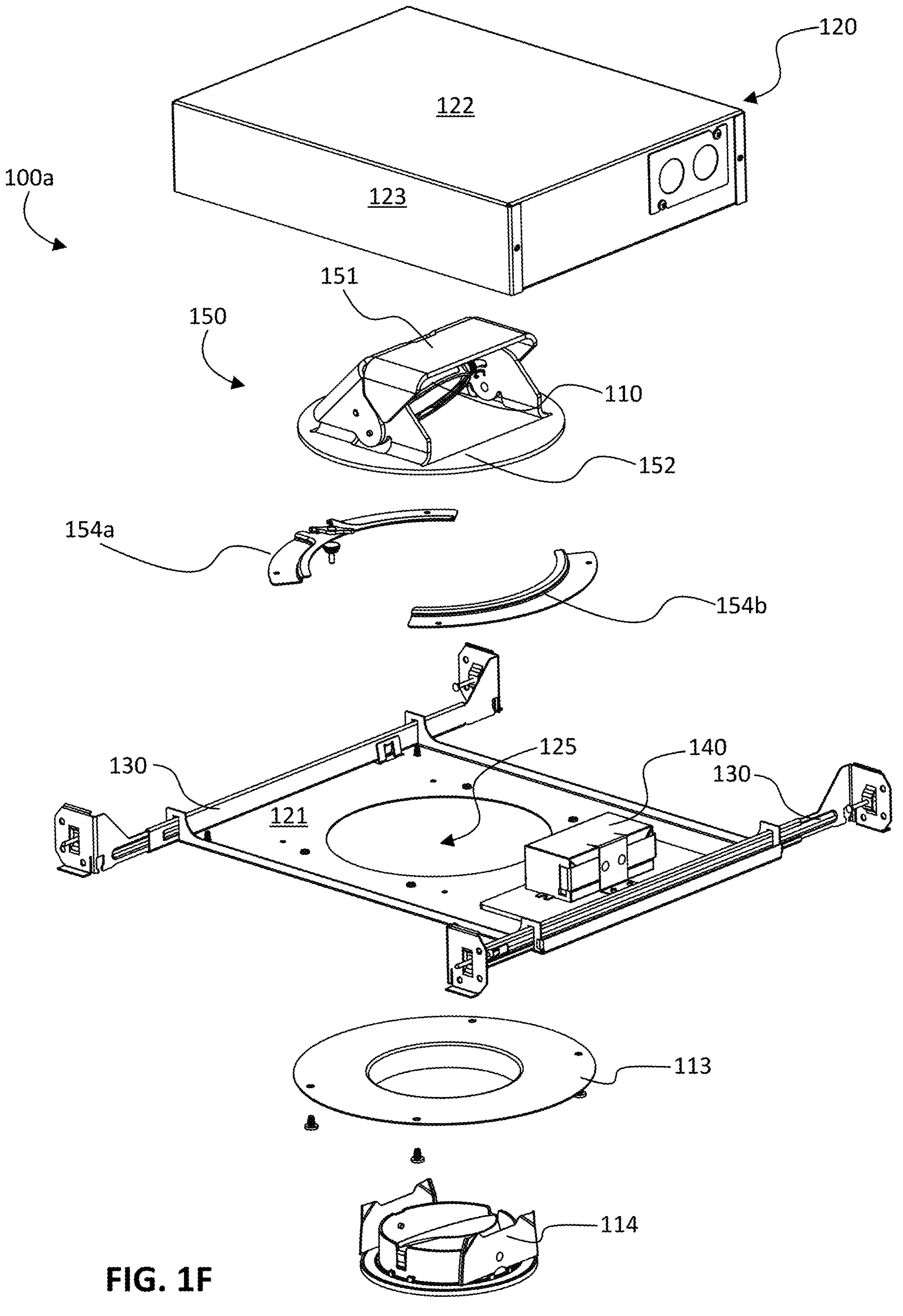
FIG. 1F is an exploded view of an example of the lighting device assembly, according to various embodiments.
Figure 1G:
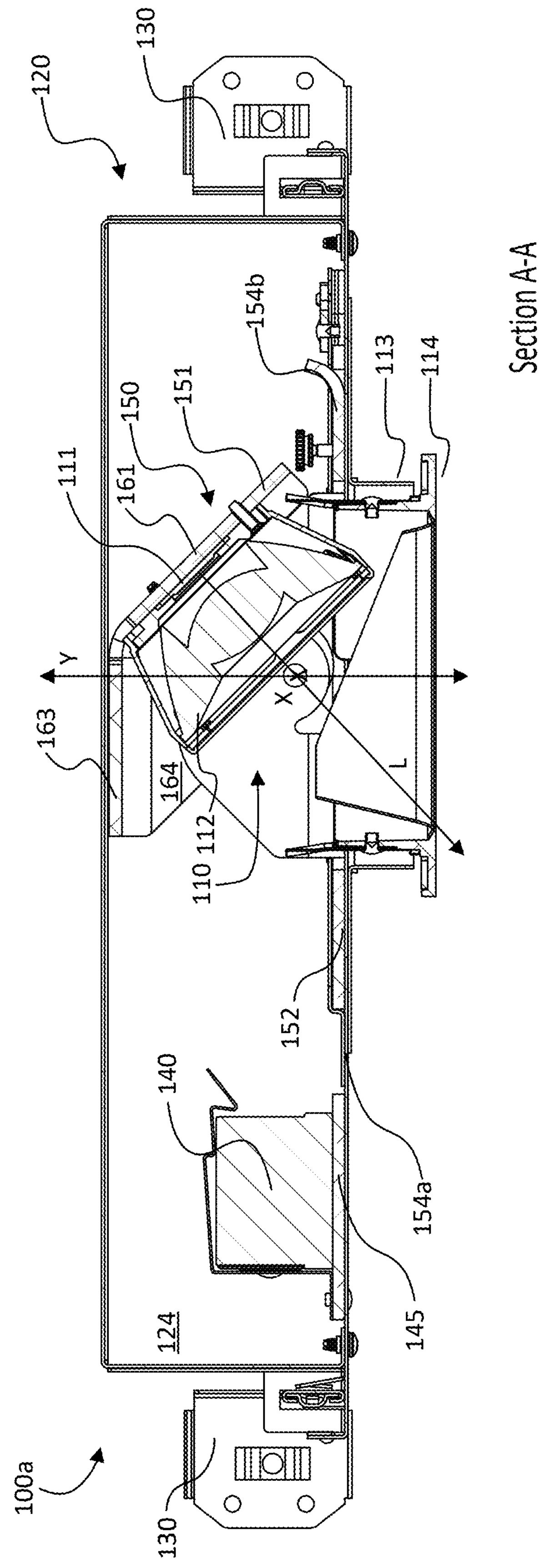
FIG. 1G is a cross-sectional view of section A-A (FIG. 1C) of an example of the lighting device assembly, according to various embodiments.
Figure 1H:
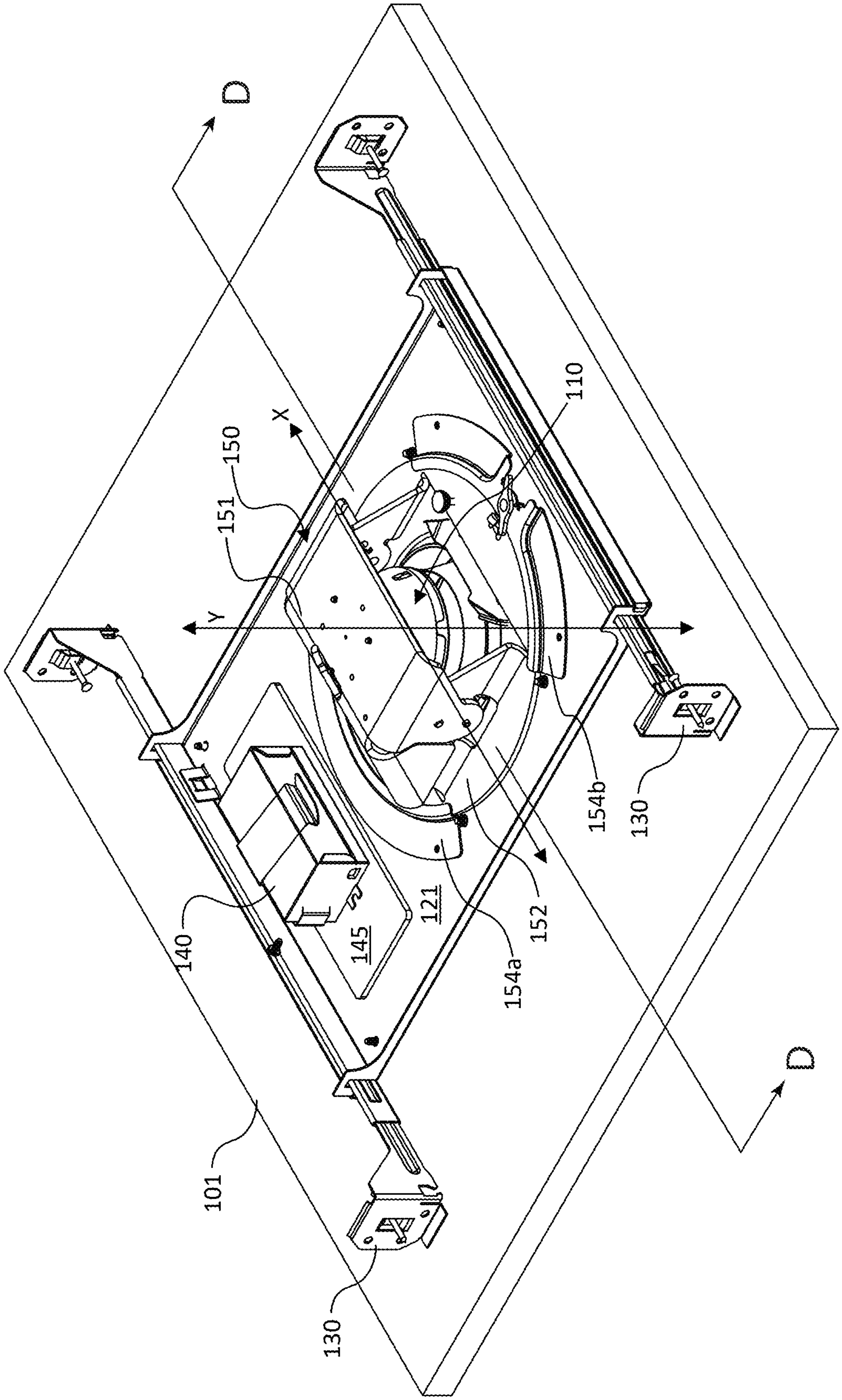
FIG. 1H is a perspective view of an example of the lighting device assembly installed on a panel with at least a portion of the housing removed except for the front side, according to various embodiments.
Figure 1I:
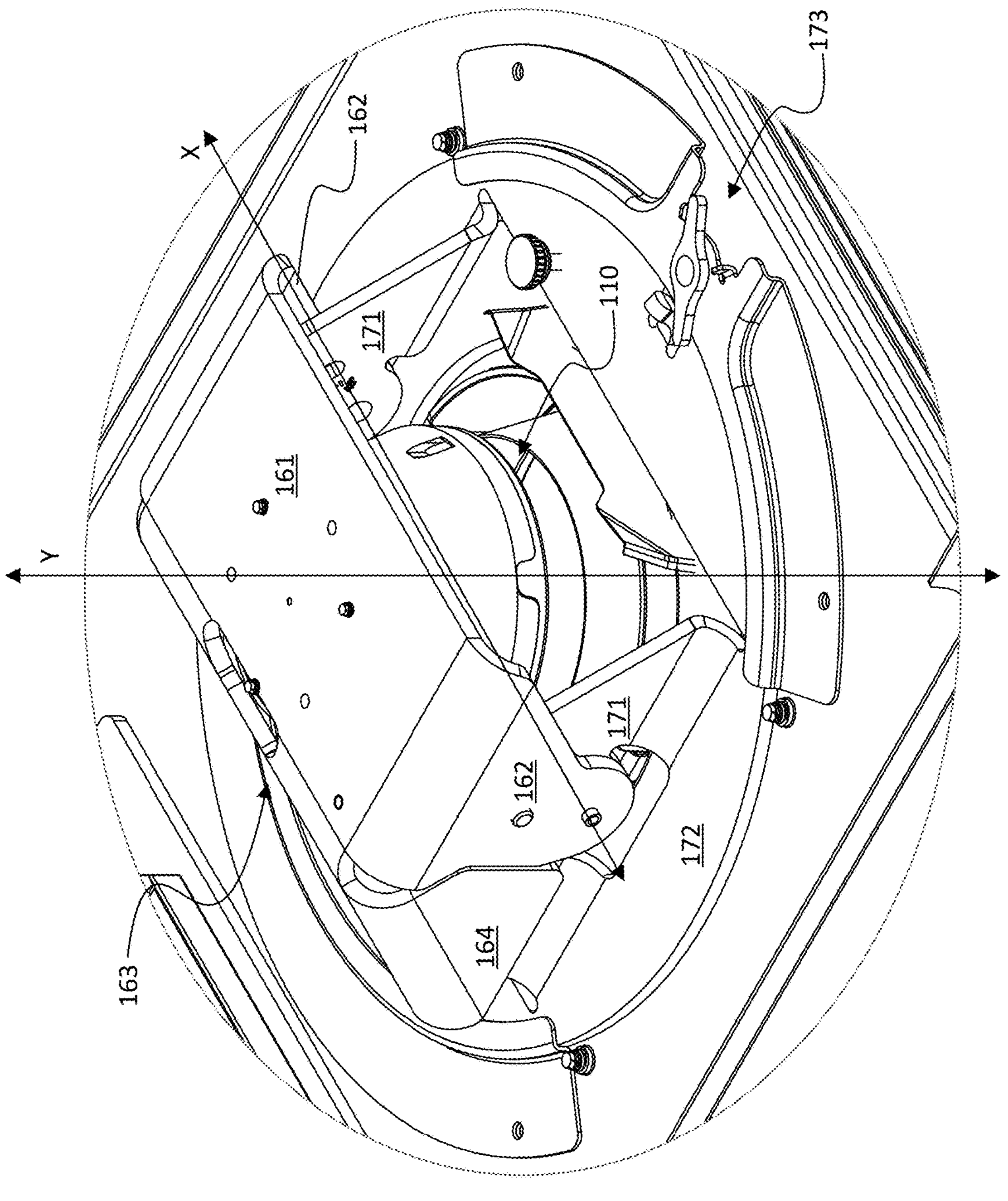
FIG. 1I is a closed-up partial view of an example of a heat sink of the lighting device assembly shown in FIG. 1H, according to various embodiments.
Figure 1J:
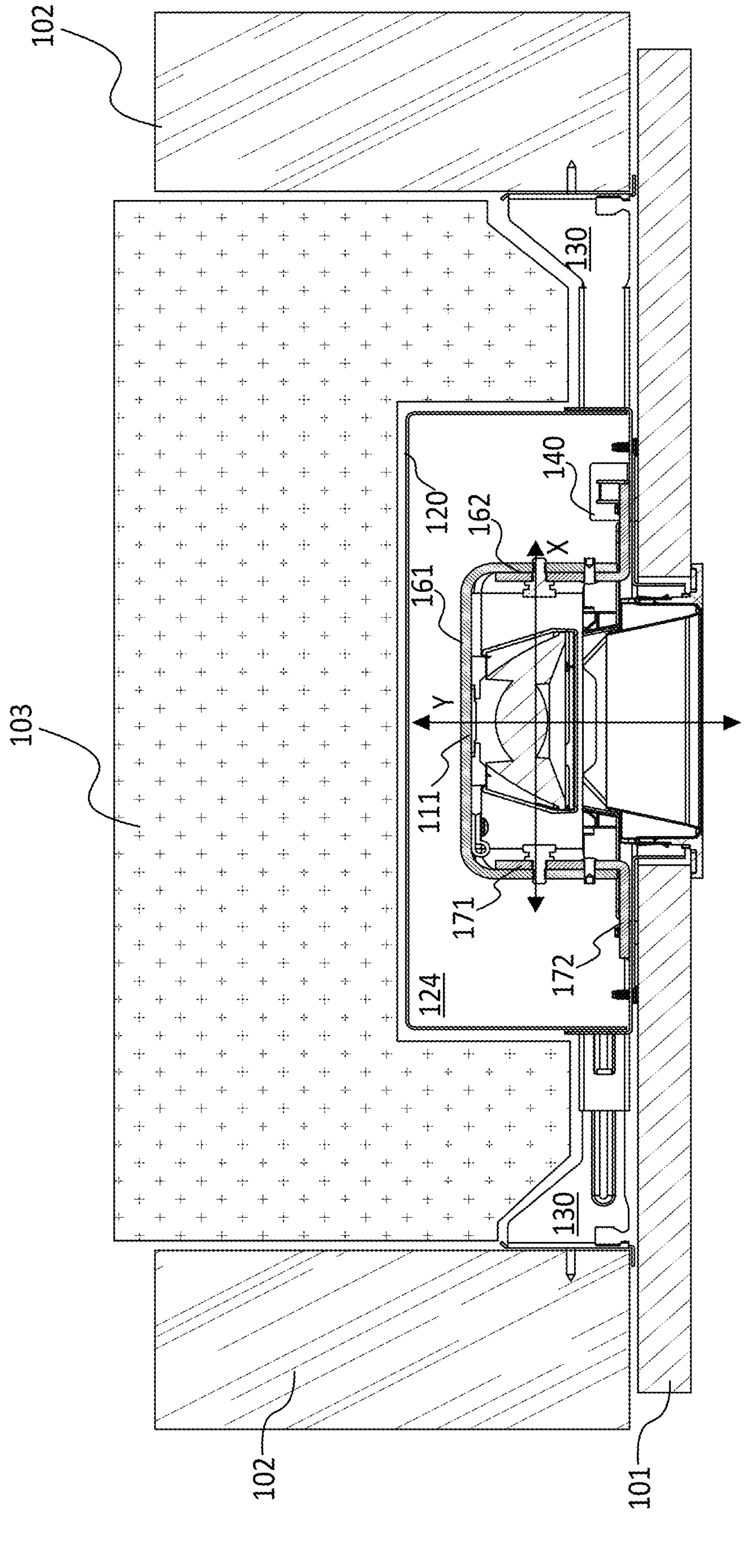
FIG. 1J is a cross-sectional view of section D-D (FIG. 1H) of an example of the lighting device assembly as deployed in a ceiling, according to various embodiments.
Figure 1K:
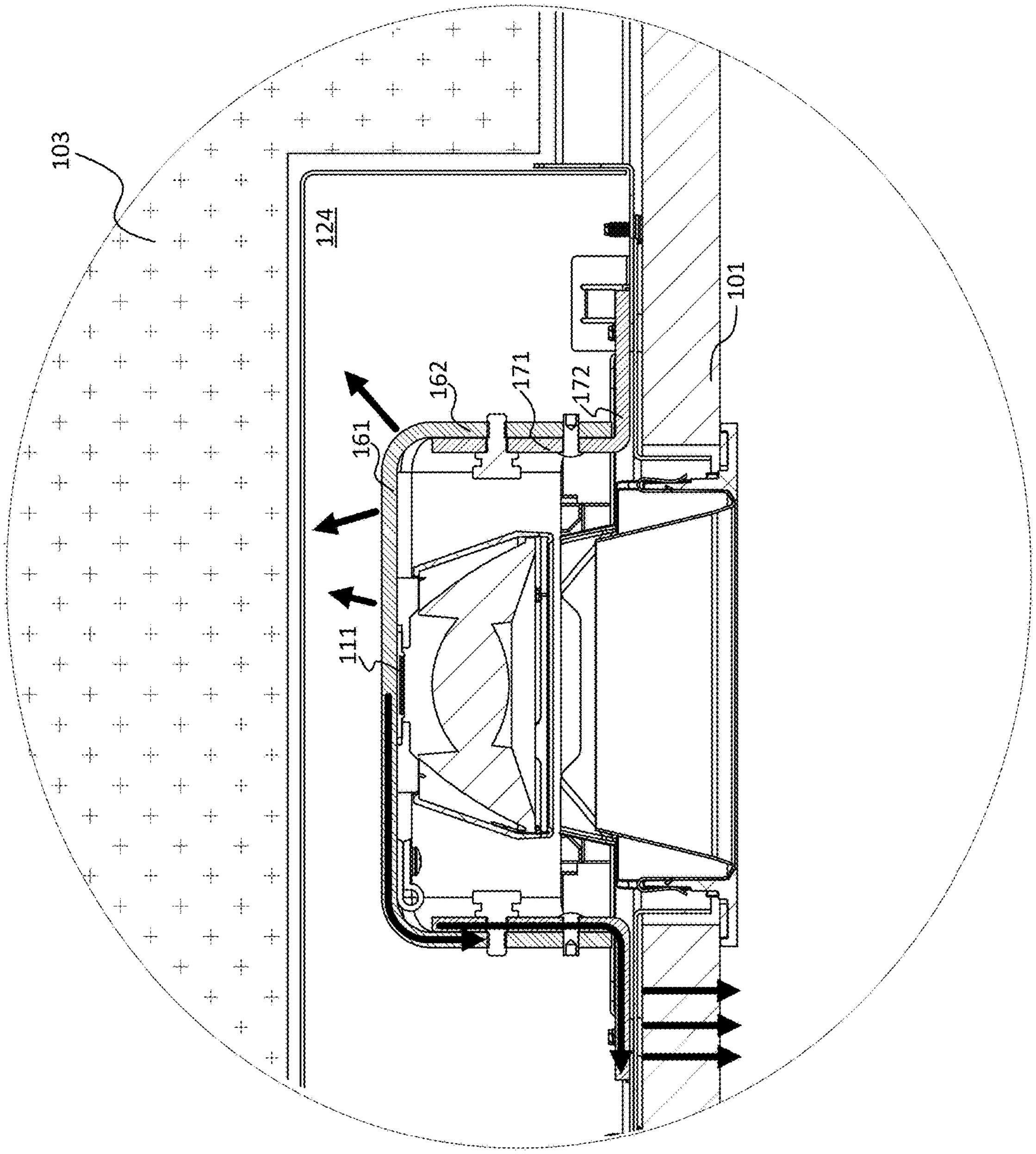
FIG. 1K is a cross-sectional closed-up partial view of a portion of the lighting device assembly shown in FIG. 1J, according to various embodiments.

FIG. 1A is a front perspective view of an example of a lighting device assembly 100*a*, according to various embodiments. FIG. 1B is a back perspective view of an example of the lighting device assembly 100*a*, according to various embodiments. FIG. 1C is a back view of an example of the lighting device assembly 100*a*, according to various embodiments. FIGS. 1D and 1E are side views of an example of the lighting device assembly 100*a*, according to various embodiments. FIG. 1F is an exploded view of an example of the lighting device assembly 100*a*, according to various embodiments. FIG. 1G is a cross-sectional view of section A-A (FIG. 1C) of an example of the lighting device assembly 100*a*, according to various embodiments. FIG. 1H is a perspective view of an example of the lighting device assembly 100*a* installed on a panel 101 with at least a portion of the housing 120 removed except for the front side 121, according to various embodiments. FIG. 1I is a closed-up partial view of an example of a heat sink 150 of the lighting device assembly 100*a* shown in FIG. 1H, according to various embodiments. FIG. 1J is a cross-sectional view of section D-D (FIG. 1H) of an example of the lighting device assembly 100*a* as deployed in a ceiling, according to various embodiments. FIG. 1K is a cross-sectional closed-up partial view of a portion of the lighting device assembly 100*a* shown in FIG. 1J, according to various embodiments.

The lighting device assembly 100*a* in FIGS. 1A-1E and 1G is shown in an assembled state. The lighting device assembly 100*a* can be attached to or installed on a panel (e.g., a ceiling panel, a wall panel, or a panel of another structure, such as the panel 101) in which the lighting device assembly 100*a* is installed or configured to be installed. The lighting device assembly 100*a* can attached to or installed in a plenum, attic space, wall space, or another volume space in the ceiling, wall, surface, or another object. An individual viewing the lighting device assembly 100*a* when the lighting device assembly 100*a* is attached to or installed on the panel can observe the features (e.g., the optic assembly 110) of the lighting device assembly 100*a* that are not covered by the panel. The lighting device assembly 100*a* includes an optic assembly 110, a housing 120, and brackets 130.

As used herein, a front direction is a direction in which an optic assembly 110 (e.g., a light source) of the lighting device assembly 100*a* faces, a direction of the light emission from the light source, and so on. A front side or a front surface face in the front direction. A back direction is a direction opposite to the front direction. A back side or a back surface face in the back direction. In some examples, the front direction and the back direction are opposite directions along an optical axis of the one or more lenses of the lighting device assembly 100*a*. A lateral side or surface extends between the front side or surface and the back side or surface. In some examples, the area for which the optic assembly 110 is arranged to provide lighting is in the front direction relative of the lighting device assembly 100*a*. In some examples, the back side, back surface, lateral side, or lateral surface of the lighting device assembly 100*a* are at least partially enclosed by the plenum, attic space, wall space, or another volume space in the ceiling, wall, or another object. As used herein a vertical axis is an axis that is or is parallel to the optical axis of the one or more lenses of the lighting device assembly 100*a*. A horizontal axis is an axis that is perpendicular or transverse to the vertical axis. Extending along an axis or dimension refers to extending along a given axis or dimension or along another axis or dimension that is parallel to the given axis or dimension.

The housing 120 includes a front side 121, a back side 122, and a plurality of lateral sides 123. In some examples as shown, the housing 120 has a generally flat, rectangular cuboid, box-like shape. In other examples, the housing 120 can have other suitable shapes or configurations. The housing 120 (e.g., the sides 121, 122, and 123 thereof) can be made of any suitably rigid material and, in particular examples, is made of a material having good (relatively high or fast rate) thermal conduction characteristics, such as, but not limited to a heat dissipating metal, plastic, ceramic or composite material, for dissipation of heat from the optic assembly 110 (e.g., the light source), a driver 140, and any other heat-generating component mounted on or enclosed within the housing 120.

The housing 120 can serve as an additional heat sink for transferring and dissipating heat from the optic assembly 110, the driver 140, and any other heat-generating component to a surrounding environment, such as the space for which the light source is illuminating, the plenum, attic space, wall space, or another volume space in the ceiling, wall, or another object adjacent to or contacting the housing 120 or the backets 130. In that regard, the housing 120 (e.g., the sides 121, 122, and 123 thereof) can include one or more plates of material having an appropriate thickness (e.g., greater than 5 mm) for functioning as a heat sink. In some examples, the housing 120 can be made of an electrically conductive metal material (or other electrically conductive material) that can be electrically connected to ground (e.g., to a ground conductor present at the installation site), to provide a grounded barrier around the components of the lighting device assembly 100*a*.

The brackets 130 (e.g., hanger bars) are coupled, attached, or fixed to the lateral sides 123 of the housing 120. For example, the brackets 130 are coupled to the lateral sides 123 via one or more fasteners (e.g., screws, pins, bolts, etc.). Examples of the brackets 130 include adjustable hanger bars located on different, opposite lateral sides 123. In some examples, a bracket 130 includes male and female slippers. The male and female slippers can be expanded or collapsed to mount a lateral side within various sizes of spaces. Examples of the brackets 130 include butterfly brackets located on different, opposite lateral sides 123. In some examples, a bracket 130 includes a middle portion configured to be coupled to a lateral side 123 and a wing on each of two sides of the middle portion. The wing includes holes for receiving one or more fasteners for coupling, attaching, or affixing the wing (along with the lateral side 123) to a beam, plank, frame, ceiling, wall, surface, or another object in the plenum, attic space, wall space, or another volume space.

Similar to the housing 120, the brackets 130 can be made of any suitably rigid material and, in particular examples, can be made of a material having good (relatively high or fast rate) thermal conduction characteristics, such as, but not limited to a heat dissipating metal, plastic, ceramic or composite material, for dissipation of heat from the optic assembly 110 (e.g., the light source), a driver, and any other heat-generating component mounted on or enclosed within the housing 120. In some examples, heat from the housing 120 can be transferred, via conduction, to the brackets 130, and the housing 120 and the brackets 130 can transfer the heat to the surrounding environment by conduction or convection. In some examples, the surrounding environment refers to the space for which the light source is illuminating, plenum, attic space, wall space, or another volume space in the ceiling, wall, or another object in which the lighting device assembly 100*a* is installed, as well as the area for which the optic assembly 110 is arranged to provide lighting. In some examples, the brackets 130 can be made of an electrically conductive metal material (or other electrically conductive material) that can be electrically connected to ground (e.g., to a ground conductor present at the installation site), to provide a grounded barrier around the components of the lighting device assembly 100*a*.

The housing 120 includes or defines a cavity 124 in which the at least a portion of the optic assembly 110 is received. For example, the front side 121, the back side 122, and the lateral sides 123 can be arranged to define and enclose a space or volume of the cavity 124. The cavity 124 can store or hold the optic assembly 110, the driver 140 for driving the optic assembly, wires, cables, and other support structure that support such components, such as a heat sink 150.

The driver 140 is connected to a power source (e.g., a power outlet, a battery, power line, and so on) via suitable cables. One or more cables from the driver 140 is connected to driving the light source 111. The driver 140 is configured to convert power provided by the power source to a suitable power for driving the light source 111. In some examples, the driver 140 can include a processor to execute instructions stored on memory (e.g., non-transient computer readable media) or transmitted to the processor, to process data and/or to control various functions of the lighting device (such as, but not limited to, temperature, light output, color of light, direction of light, focus of light, and/or the like). In particular examples, the light source 111 includes an LED, and the driver 140 includes one or more LED drivers to drive the LED light source 111.

Optic Assembly 110

The optic assembly 110 includes one or more light modules, each including a light source 111, an optic member 112, and an optical assembly housing configured to enclose the light source 111 and the optic member 112. In some examples, the optic assembly 110 is configured to be selectively installed in and received by (or removed from) the rest of the lighting device assembly 100*a* (e.g., at an opening 125 of the housing 120), while the rest of lighting device assembly 100*a* is in a mounted state in or on the ceiling, wall, or another structure via the brackets 130.

The light source 111 can include any suitable light emitting device or devices. In some examples, a light source 111 includes one or more LEDs or other light source that generates heat during operation. While particular examples described herein include at least one light source 111 having one or more LEDs, other examples of the light source can include other suitable light sources such as halogen, halide, fluorescent, or incandescent light sources, other electrical discharge or electroluminescence device, and so on. In some examples, the light source 111 can be mounted on a circuit board or other support structure. In some examples, the light source 111 is fixed to and mounted in thermal communication with (e.g., directly contacting through conduction or through convection over a gap) the mounting surface of the heat sink 150 for the heat sink 150 to efficiently receive and conduct heat from the light source 111. By dissipating heat away from the light source 111, the efficiency and light output of the light source 111 can significantly improve.

The optic member 112 can be a lens, filter, or other optical device that passes light emitted from the light source 111 and affects a characteristic of the light being passed. In some examples, the optic member 112 includes a lens configured to focus light toward one or more focus points or centers of focus. In some examples, the optic member 112 can have a configuration for directing light through a relatively small aperture or opening. Some examples of such optic members that can be employed for optic member 112 are described in the Applicant's U.S. Pat. No. 10,900,654 (which is incorporated herein by reference, in its entirety). In other examples, the optic member 112 can include other suitable lens configurations.

In some examples, the optic assembly 110 (e.g., the optical assembly housing) is coupled to the opening 125 of the housing 120 via a collar 113 and a trim member 114. The collar 113 can be arranged on or attached to a front surface of the front side 121 via one or more fasteners (e.g., screws, pins, bolts, etc.). A portion of the collar 113 extends in the front direction away from the lighting device assembly 100*a*. The collar 113 defines an opening corresponding to the opening 125 of the housing 120. The collar 113 is shaped and sized to receive a portion of the trim member 114.

The trim member 114 (e.g., a flanged trim) can be configured to provide one or more functions including, but not limited to aesthetic or ornamental functions, heat dissipation functions, or combinations thereof. The trim member 114 can include a first portion shaped and sized to extend into and engage the opening of the collar 113 and the opening 125 of the housing 120. For example, the first portion of the trim member 114 can include one or more of a snap clip, latch, clamp, buckle, hook, friction fitting, clamps, or other fasteners configured to removably attach (without tools) the first portion of the trim member 114 to one or more of a portion of the collar 113 that defines the opening of the collar 113 or a portion of the front side 121 of the housing 120 that define the opening 125. The trim member 114 can include a second portion that forms a flange or lip around and adjacent the opening 125 of the housing 120 and/or the opening of the collar 113. When the light device assembly 110 is installed in the lighting device assembly 100*a* and mounted in a ceiling, wall, surface, or another structure, the flange or lip portion of the trim member 114 can be exposed relative to the exposed surface of a ceiling, wall, outer housing, or another object) of the ceiling, wall, or another structure.

In some examples, the flange or lip portion of the trim member 114 is configured to cover (and hide from view) a space or gap between the housing 120 and the openings in the mounting surface that can otherwise be visible. Additionally or alternatively, the flange or lip portion of the trim member 114 can be configured with an ornamental or aesthetic design or an appearance that corresponds to and matches the appearance of the mounting surface to be visually obscure. When installed, the trim member 114 (or the flange or lip of the trim member 114) can fit flush with or abutted against the mounting surface. The trim member 114 being removably attached to the collar 113 without tools allows easy downstream customization of the trim member 114, such that a user can select a trim member 114 with the preferred appearance (e.g., size or collar) to attach to the housing 120 and the collar 113.

Heat Sink 150

The heat sink 150 is a metal support structure configured to couple the optic assembly 110 to the opening 125 of the housing 120 that defines the cavity 124. The heat sink 150 is arranged within the cavity 125. The heat sink 150 includes, is configured as, or is formed as a hinged aiming mechanism configured to movably couple the optic assembly 110 to the housing 120 to allow the light source 111 and the optic member 112 to move relative to the housing 120. In other words, the hinged aiming mechanism can aim the light from the light source 111 at a particular direction.

The hinged aiming mechanism of the heat sink 150 includes a first bracket 151 supporting a first movement relative to the housing 120 and a second bracket 152 supporting a second movement relative to the housing 120. For example, the first movement includes a first rotational movement about a first axis X, and the second movement includes a second rotational movement about a second axis Y. In some examples, the first axis X and the second axis Y are perpendicular or orthogonal to one another. A user can aim a direction of light emission L of the light source 111 by rotating the first bracket 151 about the first axis X and rotating the second bracket 152 about the second axis Y.

The first bracket 151 (e.g., a main bracket) includes a middle portion 161 and side portions 162 supporting the middle portion 161. In some examples, on either side of the middle portion 161 is a side portion 162. In some examples, the middle portion 161 and the side portions 162 are formed from a same sheet metal that is bent (e.g., at 90° or another suitable such as between 45° to −135°, or between 60 to −150°) at locations corresponding to the sides of the middle portion 161, such that the side portions 162 and the middle portion 161 form an arched shape (e.g., a U-shape) defining a space or receptable configured to accommodate or receive at least a portion of the optic assembly 110. As shown, when the optic assembly 110 is coupled, attached, or fixed to the middle portion 161 and is located within the space or receptable formed by the portions 161 and 162, the middle portion 161 extends over the optics assembly 110. The middle portion 161 is between the optics assembly 110 and the back side 122 of the housing 120. At least a portion of the optic assembly 110 is coupled, attached, or fixed to the heat sink 150 (e.g., the middle portion 161) via one or more fasteners such as a snap clip, latch, clamp, buckle, hook, adhesives, welding, friction fitting, clamps, or other fasteners. For example, the light source 111 and a base of the optic member 112 can be coupled, attached, or fixed to the middle portion 161 via the one or more fasteners.

In some examples, the first bracket 151 further includes an additional middle portion 163 and additional side portions 164. In some examples, on a different side of the middle portion 161 is the middle portion 163, and on either side of the middle portion 163 is a side portion 164. In some examples, the middle portions 161 and 163 and the side portions 162 and 164 are formed from a same sheet metal, which that is bent (e.g., at 135° or another suitable such as between 90°-160°) at locations corresponding to the side of the middle portion 161, such that the middle portion 163 further defines the space or receptable configured to accommodate or receive at least a portion of the optic assembly 110 and covers a side of the optic assembly 110. In some examples, surfaces of a side portion 162 and a side portion 164 are parallel and/or coplanar. To accommodate the bending between the portions 161, 162 and portions 163, 164, holes and cutouts can be made on the sheet metal between the portions 161, 162 and portions 163, 164 before bending the portions 161, 162 with respect to the portions 163, 164, vice versa.

In some examples, the first bracket 151 can be rotated about the first axis X by a user manually to rotate the direction of light emission L by at most 45° in one direction relative to the second axis Y, which effectively allows the direction of light emission L to rotate at most 45° in the opposite direction relative to the second axis Y by manually rotating the second bracket 152 about the second axis Y for 180°. Accordingly, to allow the direction of light emission L a range of movement of 90°, the first bracket 151 needs to only have a range of movement of 45° in one direction about the first axis X. This allows the addition of the portions 163 and 164 at the other direction about the first axis X relative to the portions 161 and 162, to function as additional heat sink material for transferring and dissipating heat. The portions 161, 162, 163, and 164 are composed of a single, unitary body of the sheet metal with the appropriate thickness as described, and function as a single heat continuous head sink for improved heat conduction.

At an initial position of the first bracket 151 in which the direction of light emission L is along the second axis Y (e.g., at 0° relative to the second axis Y), the middle portion 161 is adjacent to the back side 122 for improved heat transfer from the middle portion 161 to the back side 122 via convection or conduction. At a maximum tilt position of the first bracket 151 in which the direction of light emission L is at 45° relative to the second axis Y, the middle portion 163 is adjacent to the back side 122 (as shown inn FIGS. 1G and 3G) for improved heat transfer from the middle portion 163 to the back side 122 via convection or conduction. The angled configuration of the middle portions 161 and 163 and the addition of the side portions 164 provide additional surface area for transferring heat to the cavity 124 via convection. Thus, by having the middle portion 161 angled with respect to the middle portion 163, overall heat transfer from the optic assembly 110 to the cavity 124 and the housing 120 can be improved.

Each side portion 162 is rotatably coupled to or supported by the second bracket 152, which is rotatably coupled to or supported by the housing 120 (e.g., the front side 121). The second bracket 152 (e.g., a rotating base bracket) includes a collar 172 and an engagement portion 171 extending from the collar 172. The collar 172 engages at least one groove located at or adjacent to the opening 125 of the housing 120. At least a portion of the optic assembly 110 is exposed through the opening 125. The collar 172 is configured to rotate along the at least one groove. The at least one groove can be formed using the inner surface of the front side 121 and mounting brackets 154*a* and 154*b*. The mounting brackets 154*a* and 154*b* can be coupled to the interior surface of the front side 121 of the housing 120 adjacent to the opening 125 (e.g., along the rim of the opening 125) via screws, pins, bolts, adhesives, etc. Each of the mounting brackets 154*a* and 154*b* has a suitable curvature that conforms to the curvature of the opening 125.

For example, each of the mounting brackets 154*a* and 154*b* has a base portion for coupling to the interior surface of the front side 121 and a raised ridge connected to the base portion. The base portion can contact the interior surface of the front side 121. The raised ridge is spaced apart from the interior surface of the front side 121 and forms the groove or a channel with the interior surface of the front side 121. A curved edge of the collar 172 can be received in the groove and can slide in the groove between the ridge and the interior surface of the front side 121. In some examples, the edge of the collar 172 contacts or abuts the ridges of the mounting brackets 154*a* and 154*b* and the interior surface of the front side 121 as the edge of the collar 172 slides within the groove while experiencing friction provided by the ridges of the mounting brackets 154*a* and 154*b* and the interior surface of the front side 121. While two mounting brackets 154*a* and 154*b* each having the curvature of a portion of a circular shape are shown, in other examples, one mounting bracket having the curvature of a portion or an entirety of a circular shape or three or more mounting brackets each having the curvature of a portion of a circular shape can be likewise implemented. In some examples, one or more of the mounting brackets 154*a* and 154*b* have a latch, clamp, buckle, hook, clamp, screw, nut, or another stopper for securing the collar 172 in place after a desired position of the collar 172 relative to the housing 120 and the brackets 154*a* and 154*b* is reached.

The engagement portion 171 is configured to rotatably engage the first bracket 151. The engagement portion 171 extends inward from the opening 125 of the housing 120 into the cavity 124. In some examples, the engagement portion 171 and the collar 172 are formed from a same sheet metal that is bent (e.g., at 90° or another suitable such as between) 45°-135°. The portions 171 and 172 are composed of a single, unitary body of the sheet metal with the appropriate thickness as described, and function as a single heat continuous head sink for improved heat conduction.

The engagement portion 171 extends from the collar 172 and includes one or more mechanisms for rotatably supporting the rotation of the first bracket 151. As shown, two engagement portions 171 located on either side of the optic assembly 110 are sized and shaped to align with the side portions 162. An engagement portion 171 and side portion 162 include holes that align, for receiving a fastener (e.g., a screw, pin, bolt, nut, etc.) that allows rotation of the side portion 162 relative to the engagement portion 171, about an axis of the fastener which is the first axis X. Other types of rotational joints (e.g., ball-and-socket joints) can be likewise implemented. At least a portion of the middle portions 162 and 164 directly contact the engagement portion 171 to allow heat transfer by conduction from the middle portions 162, 164 to the engagement portion 171.

In some examples, the heat sink 150, including the first bracket 151 and the second bracket 152, is made from, composed of, or includes a sheet metal. The sheet metal is metal that is formed into a flat sheet. The sheet metal can be folded to form the heat sink 150, including the first bracket 151 and the second bracket 152, therefore significantly reducing the cost of manufacturing the heat sink 150. In some examples, a portion of the heat sink 150 (e.g., a sheet metal thereof) has a thickness of at least 3 mm. In some examples, a portion of the heat sink 150 (e.g., a sheet metal thereof) has a thickness that is within a range of 2 mm-6 mm or 2.75-3.25 mm. In some examples, at least a portion of the first bracket 151 or at least a portion of the second bracket 152 has a thickness of at least 2 mm, at least 3 mm, or a thickness that is within a range of 2 mm-6 mm or 2.75-3.25 mm. In some examples, the entirety of the heat sink 150 has a uniform thickness of least 2 mm, at least 3 mm, or a uniform thickness that is within a range of 2 mm-6 mm or 2.75-3.25 mm. In some examples, at least a portion of the heat sink 150, including the first bracket 151 and the second bracket 152, has a thermal conductivity of the heat sink is at least 80 W/MK or at least 152 W/MK. In some examples, at least a portion of the heat sink 150, including the first bracket 151 and the second bracket 152, is made from aluminum, such as 6061 aluminum, metal alloys containing not less than 70% aluminum, metal alloys containing not less than 70% copper, etc.

The driver 140 is arranged on a plate 145, which is configured to support the driver 140. The driver 140 can be fastened to and directly contacting a surface of the plate 145 via one or more of screws, nails, pins, bolts, or other fasteners. In some examples, the plate 145 includes a plurality of holes to receive such screws, nails, and pins to secure drivers 145 of a variety of sizes and shapes to the plate 145. For example, first holes on the plate 145 can be used for securing (e.g., receiving screws, nails, pins, bolts, etc.) a driver of a size and shape, and second holes on the plate 145 can be used for securing (e.g., receiving screws, nails, pins, bolts, etc.) another driver of a different size and shape. In other examples, the driver 140 can be attached to the plate 145 via one or more of a snap clip, latch, clamp, buckle, hook, adhesives, welding, friction fitting, clamps, or other fasteners. In some examples, the plate 145 is coupled to and directly contacting an interior surface of the front side 121 of the housing 120 via suitable fasteners such as screws, pins, bolts, adhesives, snap clip, latch, clamp, buckle, hook, adhesive, welding, friction fitting, clamp, and so on. In some examples, the plate 145 can be made from a same material and has a same thickness as those of the heat sink 150.

Given that the lighting device assembly 100*a* is installed in a plenum, attic space, wall space, or another volume space in the ceiling, wall, or another object, and air flow is very limited or even non-existent in such spaces, primary heat dissipation mechanism for the embodiment described herein relies on heat sinks (e.g., the housing 120, the brackets 130, the heat sink 150, the plate 145, and so on) to transfer heat from the light source 111, the driver 140, or another heat dissipating component enclosed by the housing 120 to the surround environment.

In the deployment scenario shown in FIGS. 1J and 1K, the lighting device assembly 100*a* is deployed or installed within a space defined by the panel 101 (e.g., a gypsum board ceiling), the ceiling joists 102, and the ceiling insulation 103. The brackets 130 can be affixed to the joists 102 via fasteners such as nails. The panel 101 may be ⅝" thick and has an R value of 0.56. On the other hand, the insulation 103 has an R value of 30 or more. Accordingly, it is preferable to dissipate heat in the direction of the panel 101 rather than the insulation.

As shown, the first bracket 151 (e.g., the middle portion 161 and the side portions 162, also the middle portion 163 and the side portions 164) transfers heat from the light source 111 to the cavity 124 of the housing 120 by radiating heat from the light source 111 toward the cavity 124. The first bracket 151 transfer heat from the light source 111 to the second bracket 152 by conduction. As shown, the middle portion 161 and 163 of the first bracket 151 transfers heat from the light source 111 to the side portions 162 and 164 by conduction, which in turn transfers the heat to the engagement portions 171. The engagement portions 171 transfers the heat by conduction to the collar 172, which in turn transfers the heat by conduction to the front side 121 of the housing 120. The front side 121 of the housing 101 transfers the heat to the panel 101 by conduction, and given the good thermal conductivity of the panel 101, the panel 101 can dissipate the heat into the space for which the light source 111 is illuminating. Accordingly, the lighting device assembly 100*a* can be provided without including any finned heat sinks for heat dissipation.

In some examples, heat from the driver 140 can be transferred, via conduction, to the plate 145, which in turn transfers the heat by conduction to the front side 121 of the housing 120, which in turn transfers the heat to the brackets 130 and the rest of the housing 120. The housing 120 (e.g., the front side 121) and the brackets 130 can transfer the heat to the surrounding environment, including the panel 101, by conduction or convection.

Lighting Device Assembly 100*b*

Figure 2A:
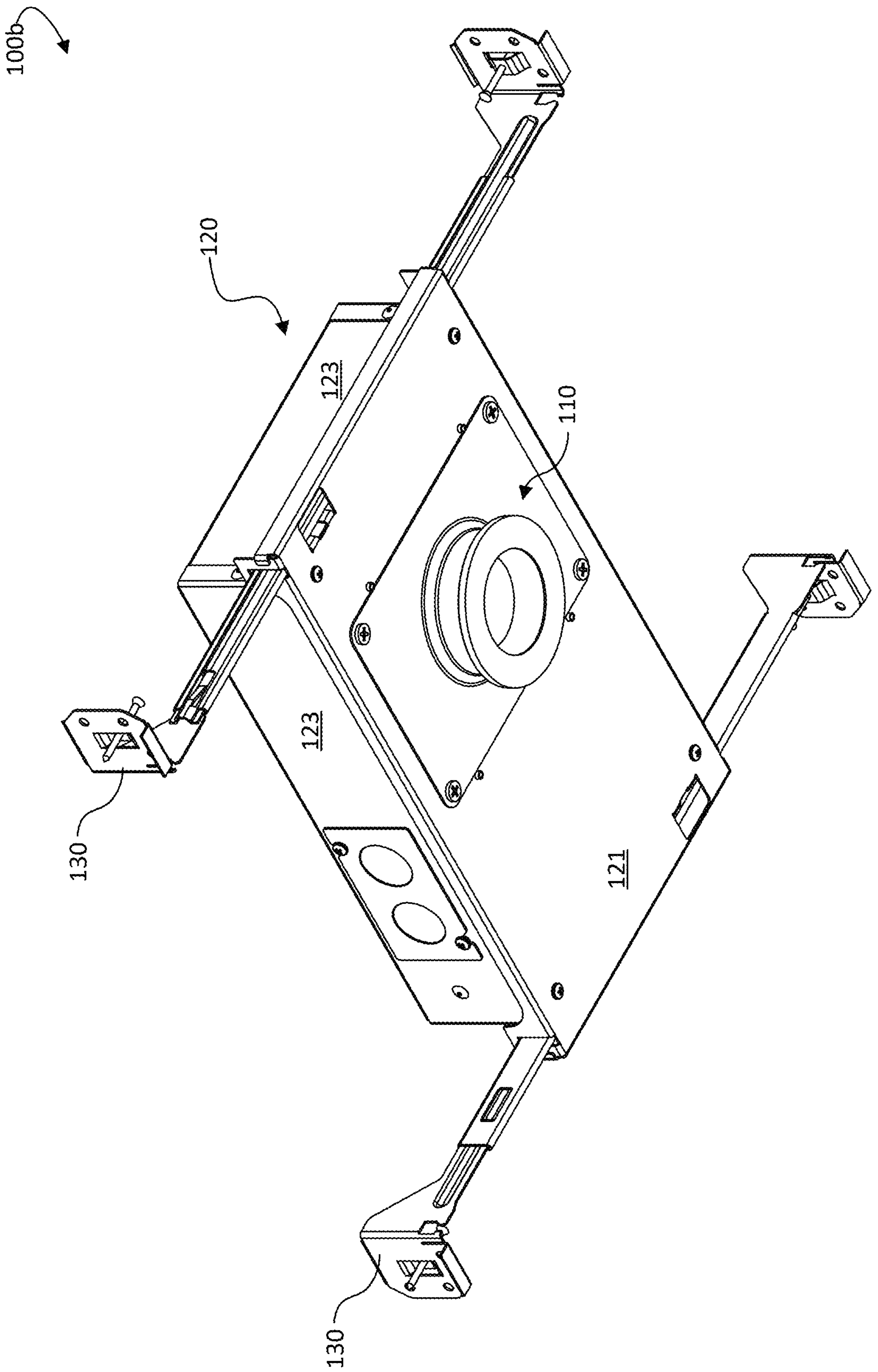
FIG. 2A is a front perspective view of an example of a lighting device assembly, according to various embodiments.
Figure 2B:
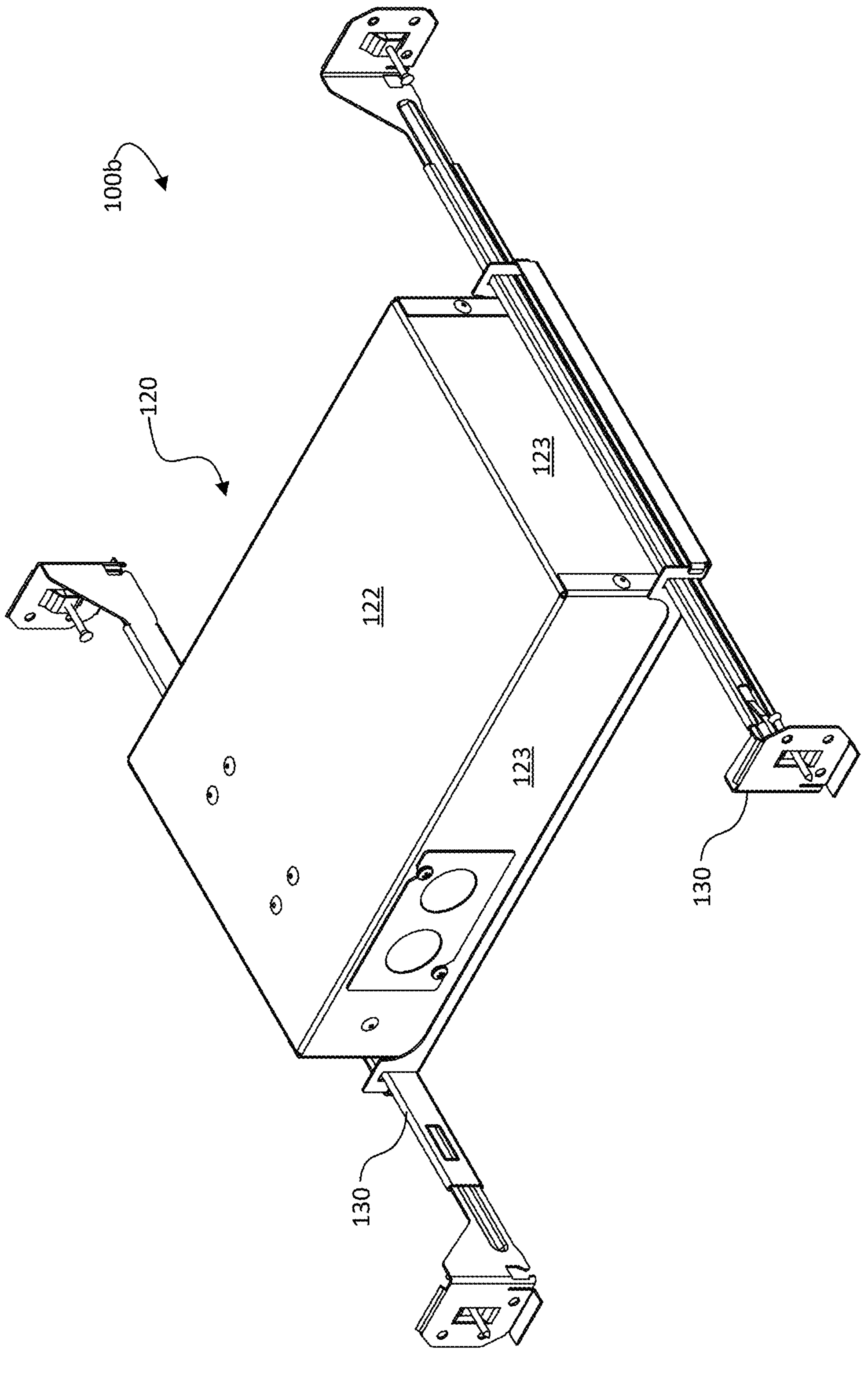
FIG. 2B is a back perspective view of an example of the lighting device assembly, according to various embodiments.
Figure 2C:
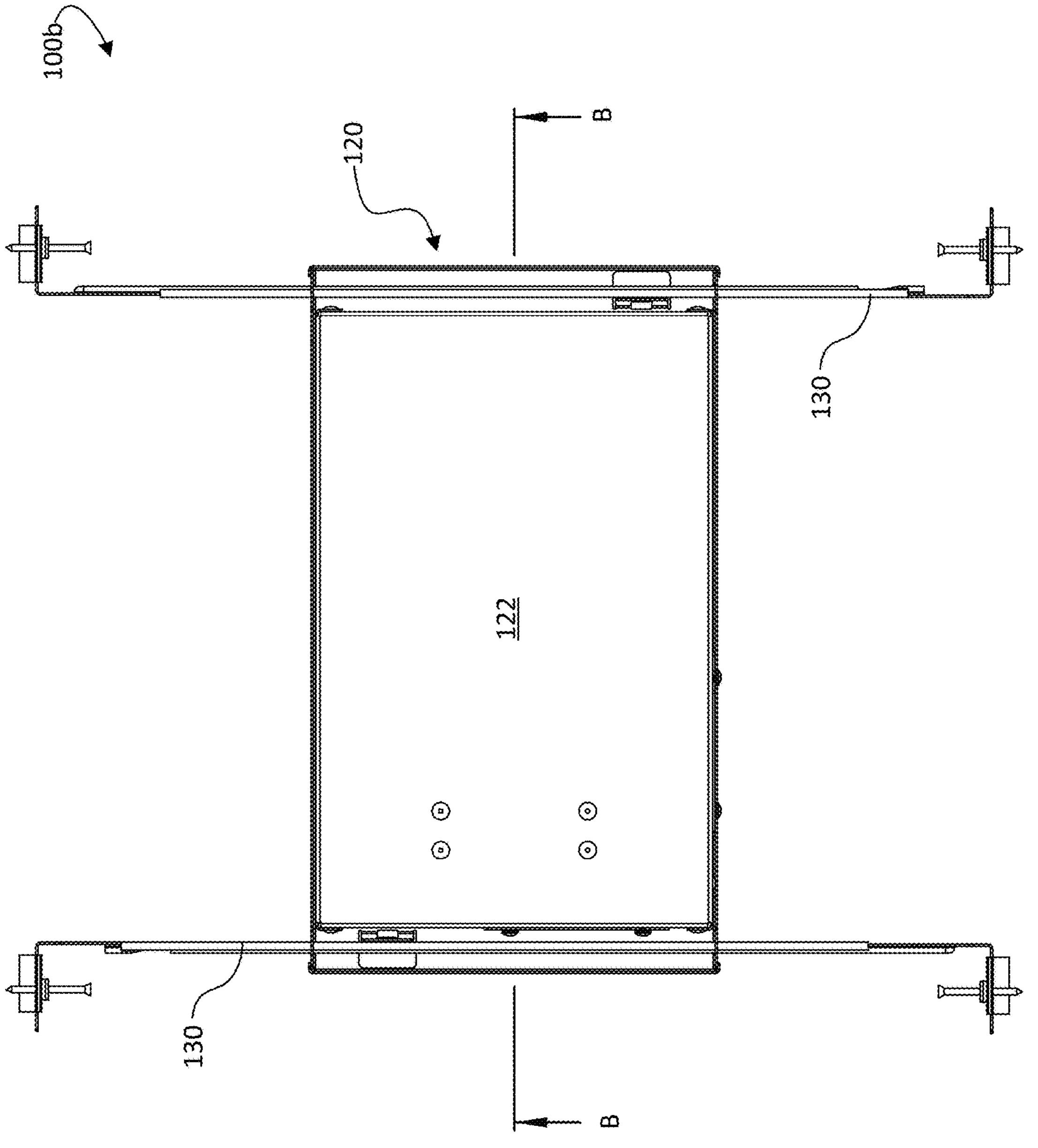
FIG. 2C is a back view of an example of the lighting device assembly, according to various embodiments.
Figure 2D:
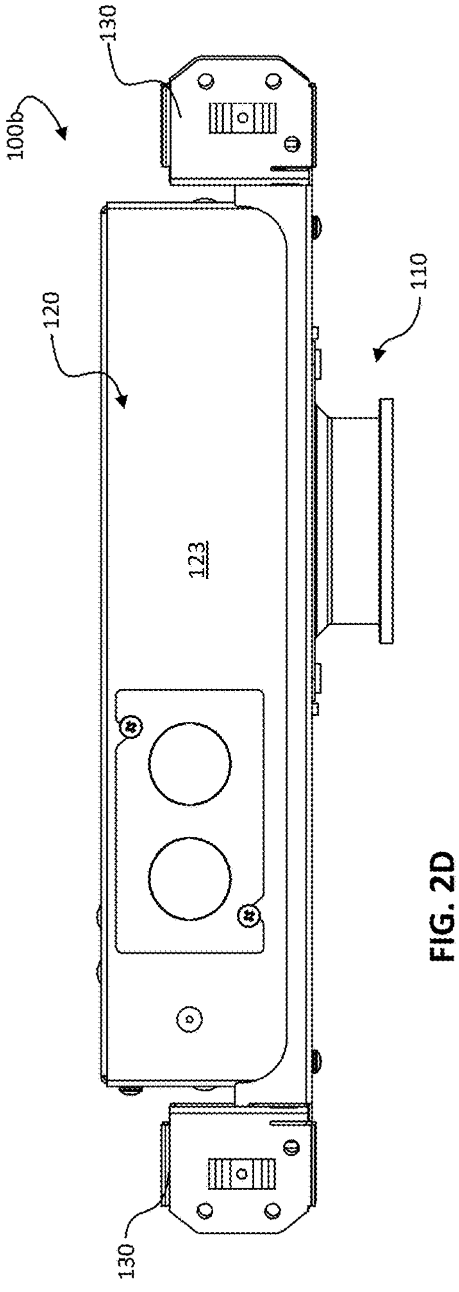
FIGS. 2D and 2E are side views of an example of the lighting device assembly, according to various embodiments.
Figure 2E:
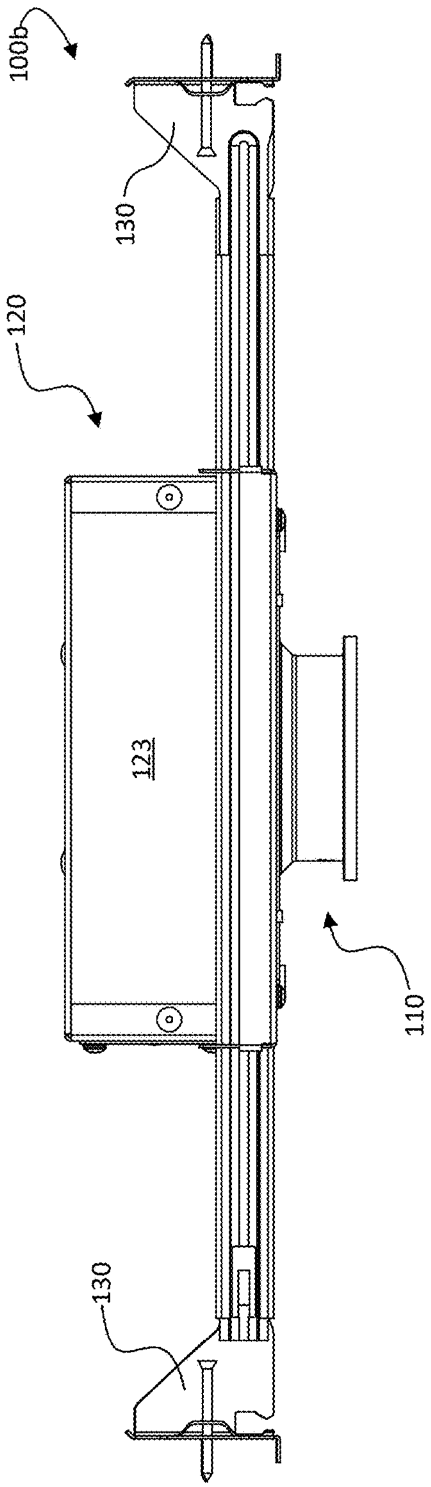
Figure 2F:
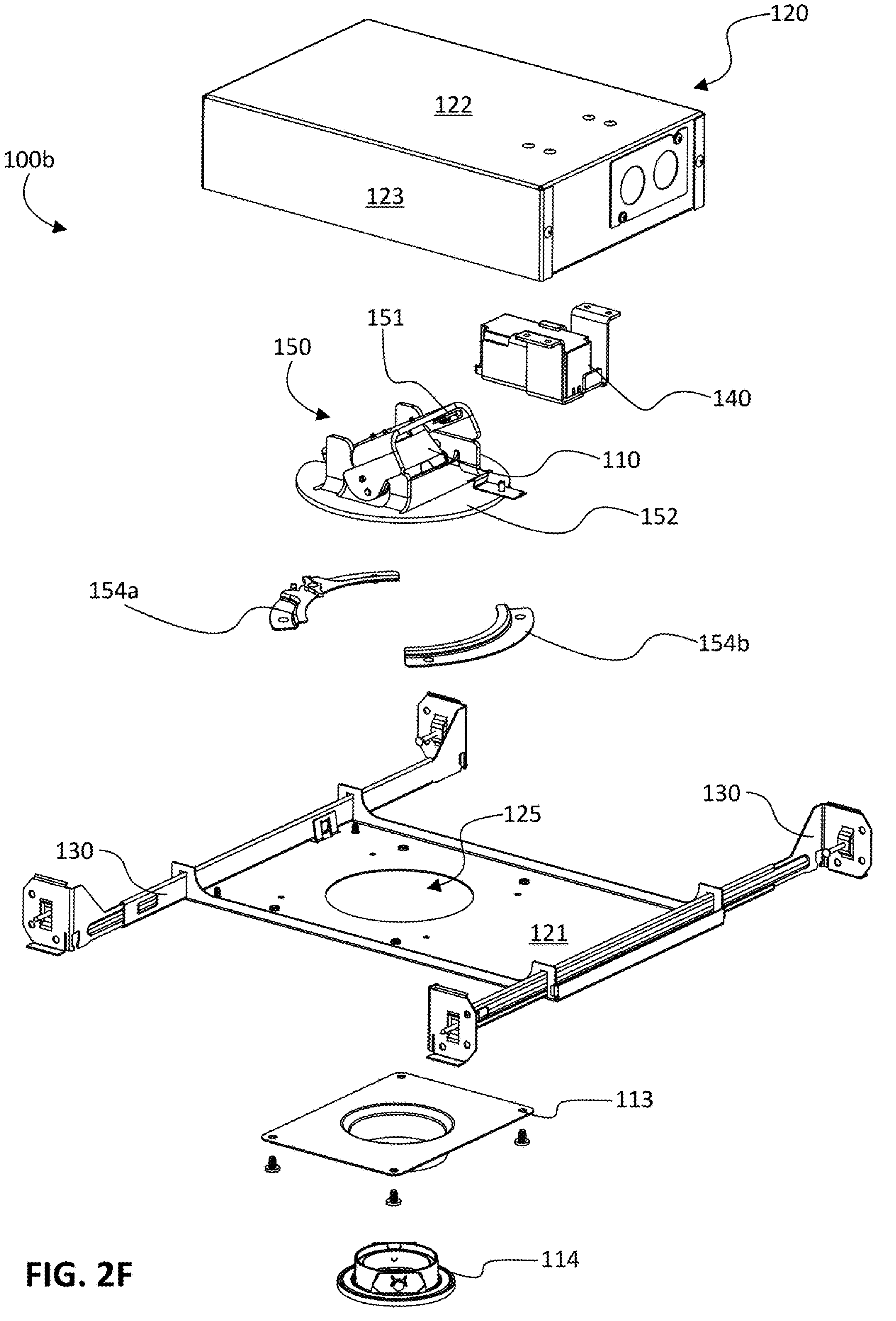
FIG. 2F is an exploded view of an example of the lighting device assembly, according to various embodiments.
Figure 2G:
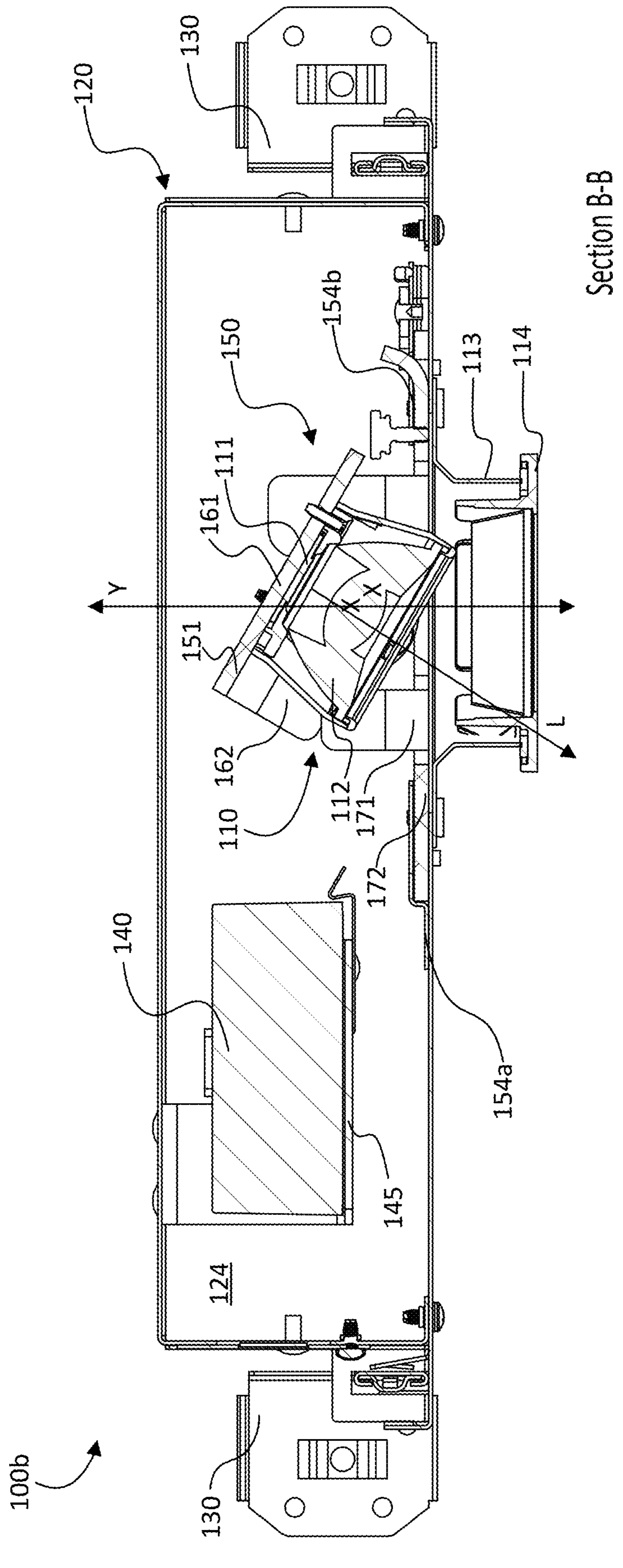
FIG. 2G is a cross-sectional view of section B-B (FIG. 2C) of an example of the lighting device assembly, according to various embodiments.

FIG. 2A is a front perspective view of an example of a lighting device assembly 100*b*, according to various embodiments. FIG. 2B is a back perspective view of an example of the lighting device assembly 100*b*, according to various embodiments. FIG. 2C is a back view of an example of the lighting device assembly 100*b*, according to various embodiments. FIGS. 2D and 2E are side views of an example of the lighting device assembly 100*b*, according to various embodiments. FIG. 2F is an exploded view of an example of the lighting device assembly 100*b*, according to various embodiments. FIG. 2G is a cross-sectional view of section B-B (FIG. 2C) of an example of the lighting device assembly 100*b*, according to various embodiments. The lighting device assembly 100*b* is similar to the lighting device assembly 100*a* in various aspects as readily apparent from the figures, with the differences described herein.

For example, the first bracket 151 of the lighting device assembly 100*b* lacks any middle portion 163 and side portions 164 in the lighting device assembly 100*a*. The collar 113 of the lighting device assembly 100*b* has a generally rectangular shape rather than a circular shape of the collar 113 of the lighting device assembly 100*a*.

In addition, the driver 140 is arranged on the back side 122 in the lighting device assembly 100*b* instead of on the front side 121 in the lighting device assembly 100*a*. For example, the driver 140 is arranged on a main portion of a plate 145, which is configured to support the driver 140. The driver 140 can be fastened to and directly contacting a surface of the plate 145 via one or more of screws, nails, pins, bolts, or other fasteners. In some examples, the plate 145 can also secure drivers 145 of a variety of sizes and shapes to the plate 145. In some examples, the plate 145 includes side portions extending from the main portion at right angles to secure the plate 145 and the driver 140 to an interior surface of the back side 122 of the housing 120 via suitable fasteners such as screws, pins, bolts, adhesives, snap clip, latch, clamp, buckle, hook, adhesive, welding, friction fitting, clamp, and so on. In some examples, the main portion and the side portions of the plate 145 as well as the back side 122 of the housing 120 define a receptacle for receiving the driver 140. The main portion and the side portions of the plate 145 can be made from a unitary material, such that the side portions of the plate 145 are bent relative to the main portion to form the plate 145. In other examples, the plate 145 can include a single sheet of material that directly couples and contacts both the back side 122 of the housing 120 and the driver 140, such that the single sheet of material is between the back side 122 and the driver 140. In some examples, the plate 145 can be made from a same material and has a same thickness as those of the heat sink 150.

In some examples, heat from the driver 140 can be transferred, via conduction, to the plate 145, which in turn transfers the heat by conduction to the back side 121 of the housing 120, which in turn transfers the heat to the brackets 130 and the rest of the housing 120. The housing 120 (e.g., the front side 121) and the brackets 130 can transfer the heat to the surrounding environment, including the panel 101, by conduction or convection.

Figure 3A:
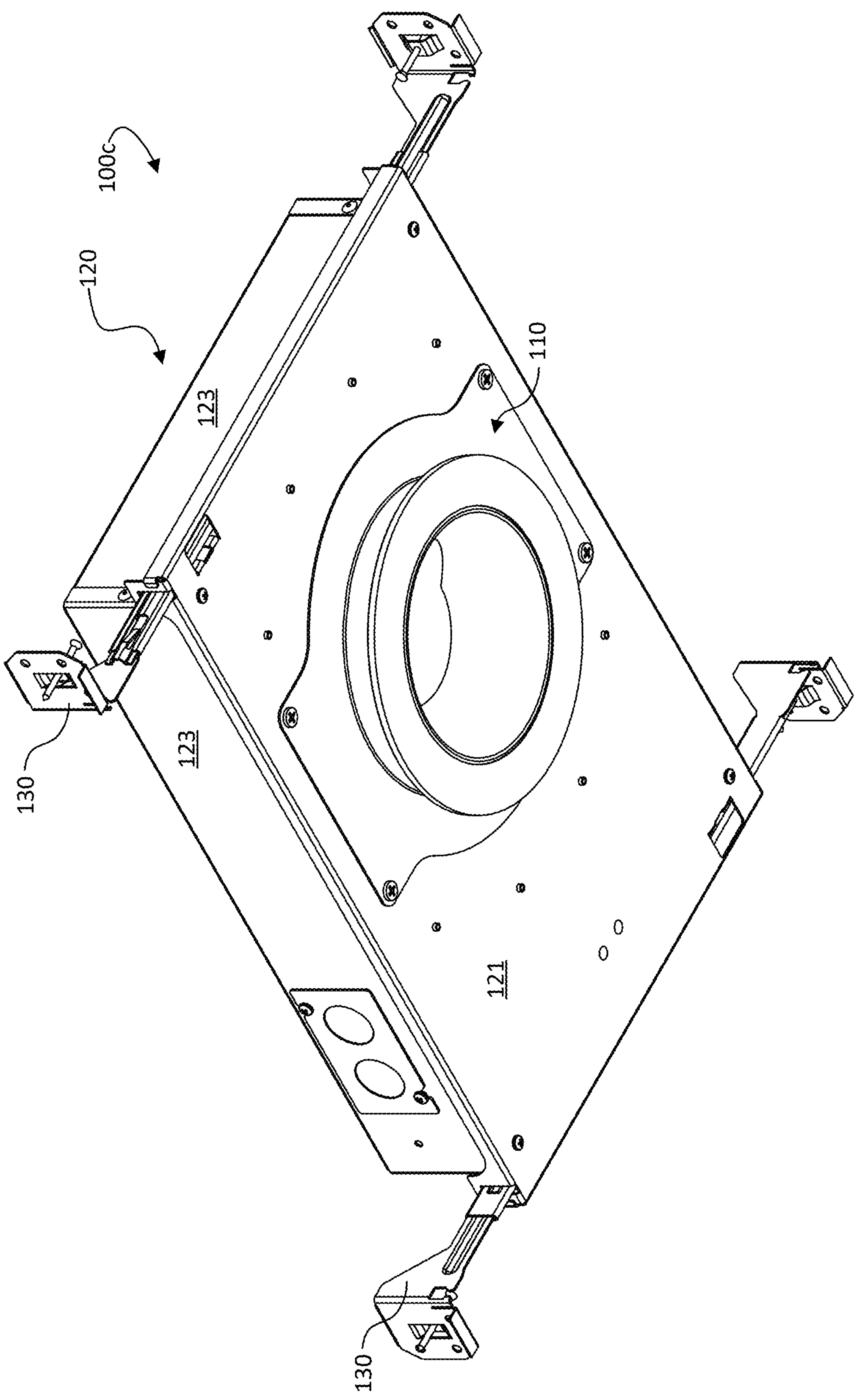
FIG. 3A is a front perspective view of an example of a lighting device assembly, according to various embodiments.
Figure 3B:
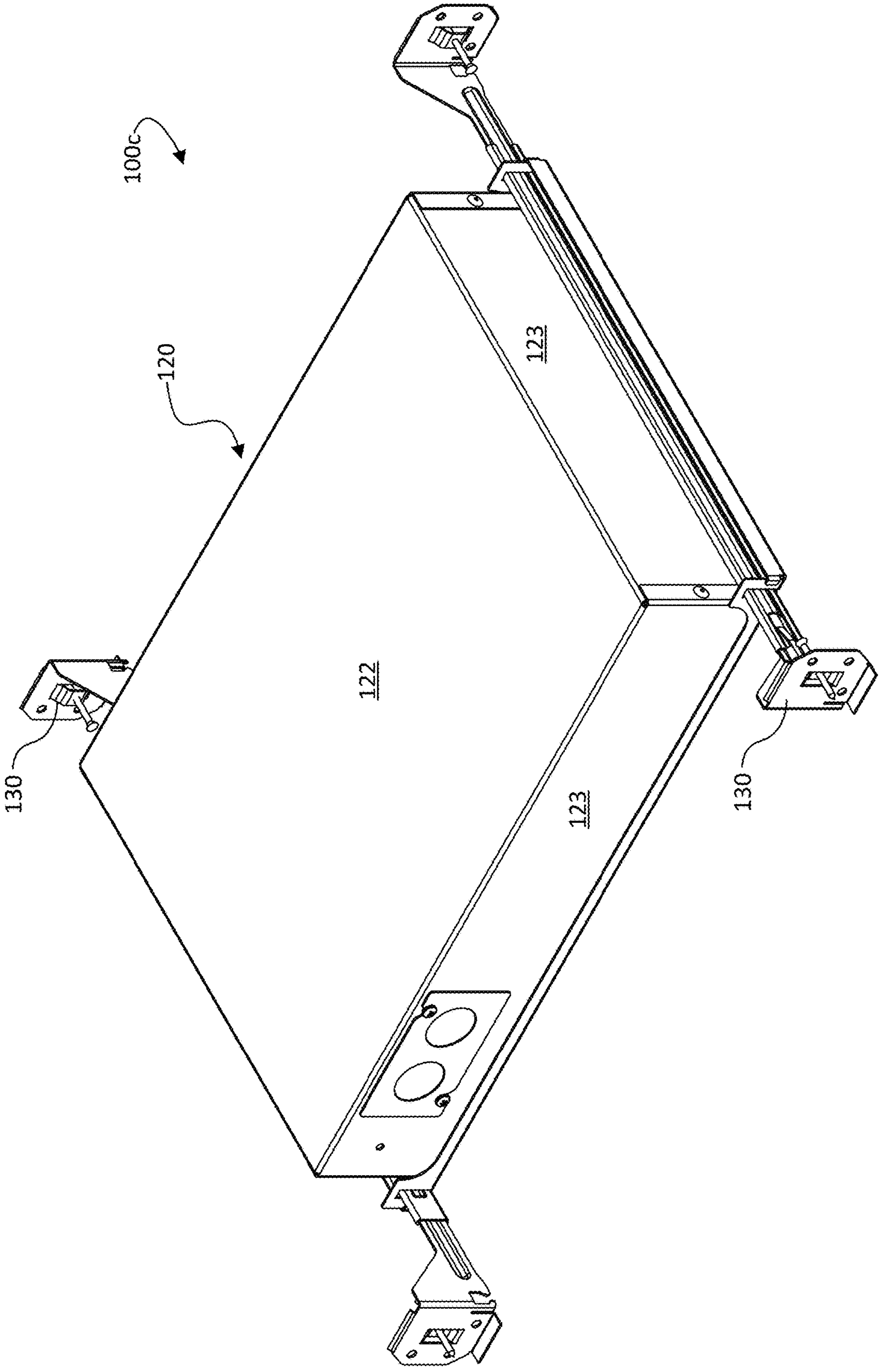
FIG. 3B is a back perspective view of an example of the lighting device assembly, according to various embodiments.
Figure 3C:
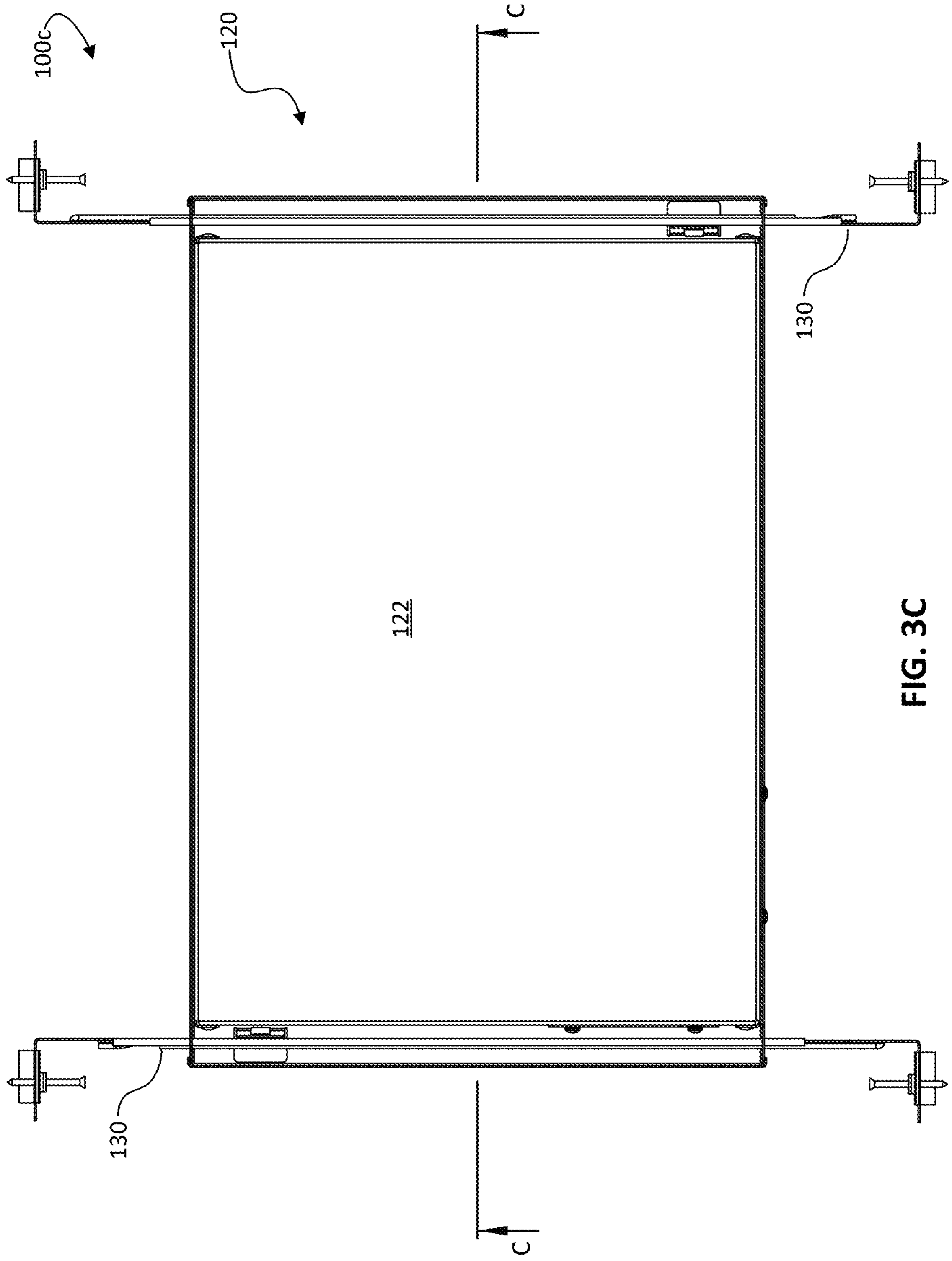
FIG. 3C is a back view of an example of the lighting device assembly, according to various embodiments.
Figure 3D:
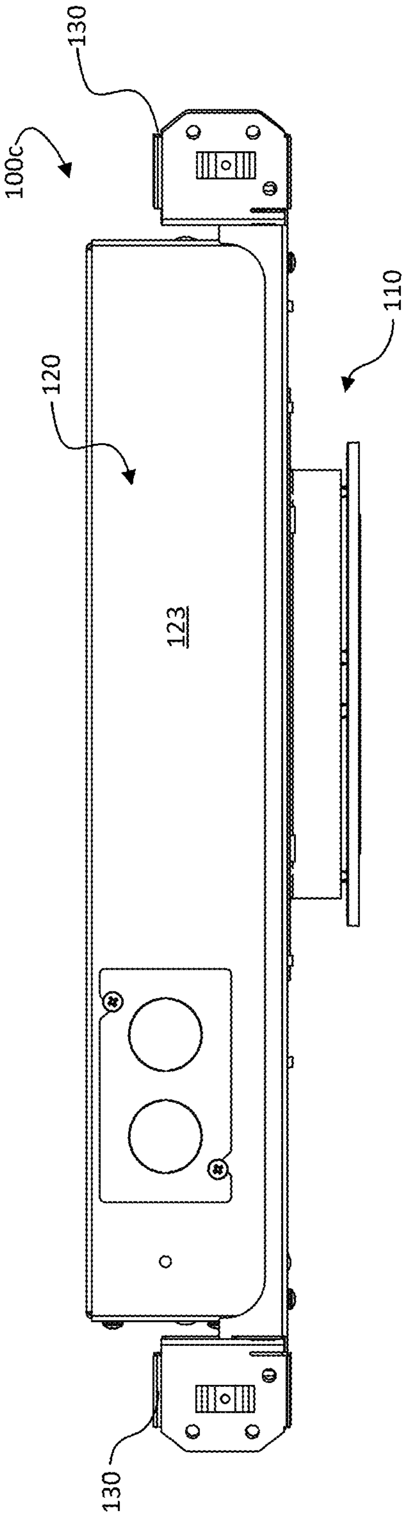
FIGS. 3D and 3E are side views of an example of the lighting device assembly, according to various embodiments.
Figure 3E:
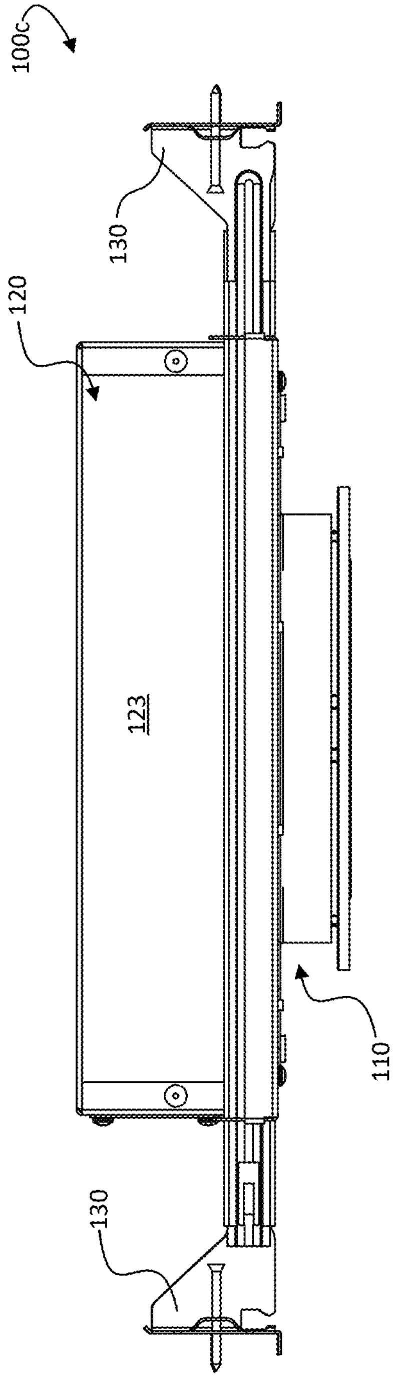
Figure 3F:
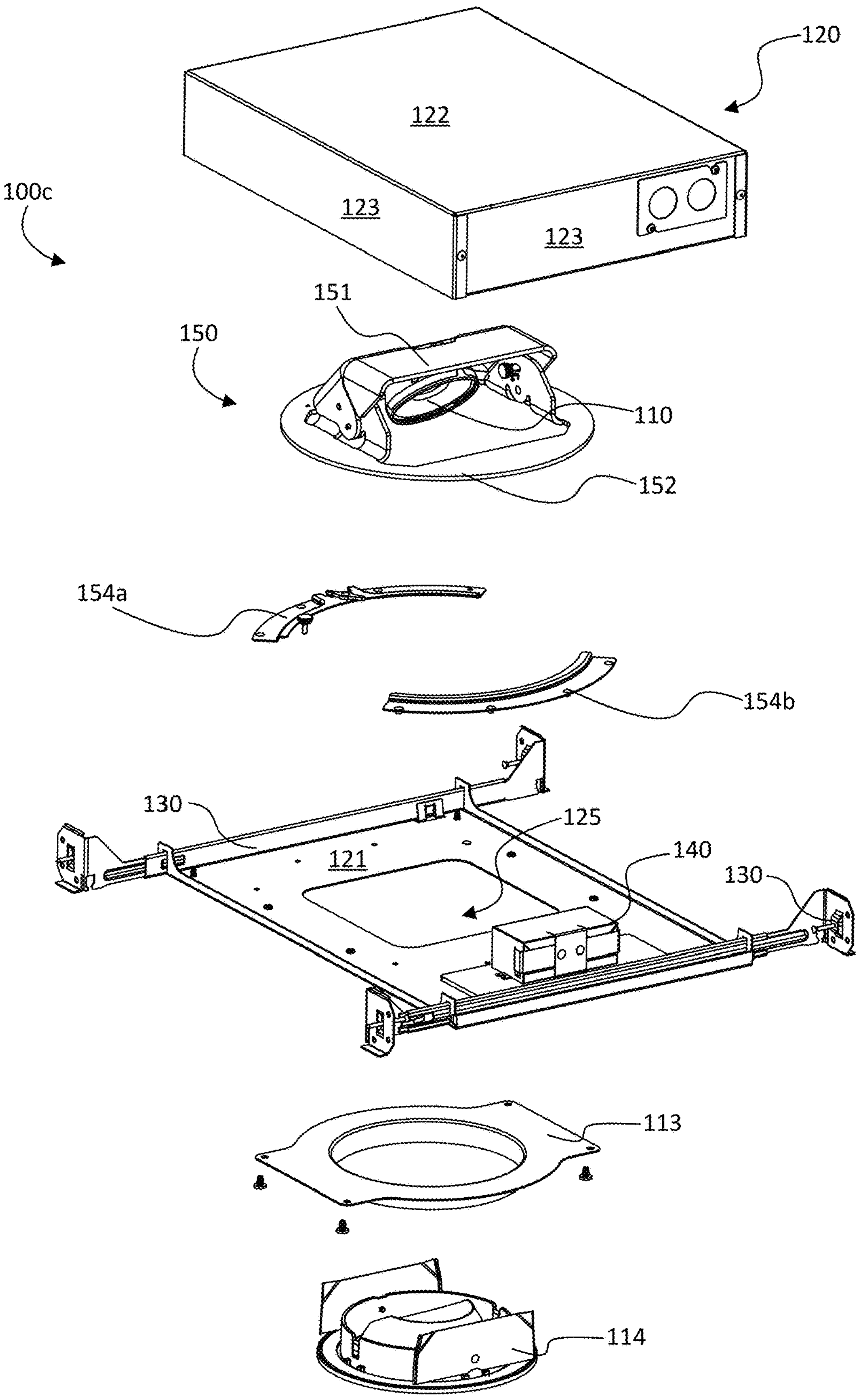
FIG. 3F is an exploded view of an example of the lighting device assembly, according to various embodiments.
Figure 3G:
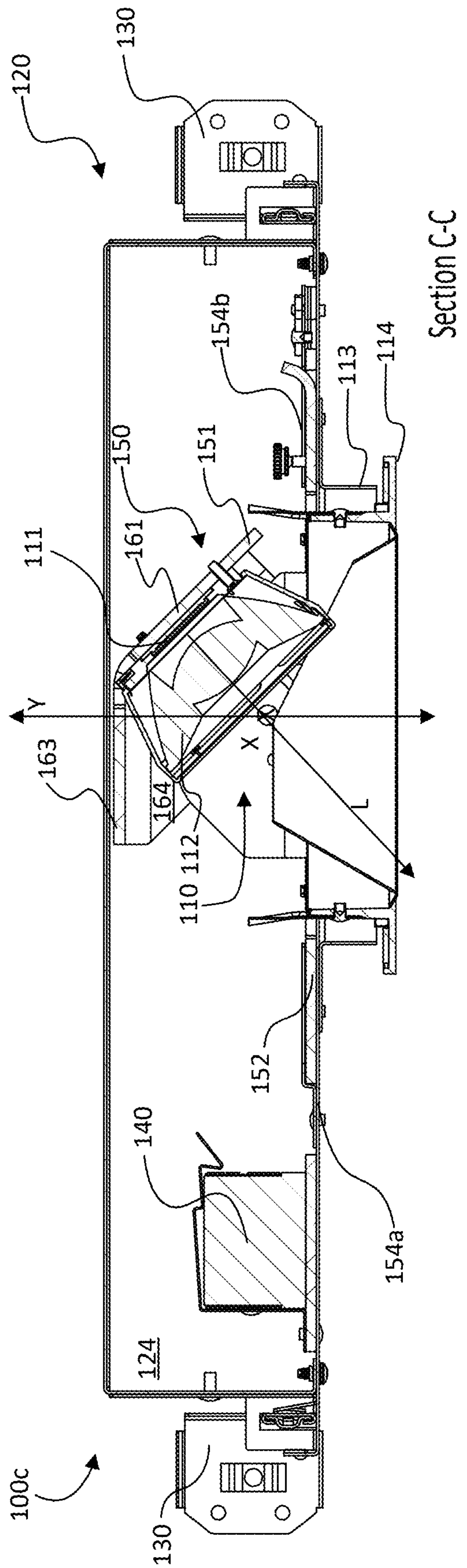
FIG. 3G is a cross-sectional view of section C-C (FIG. 3C) of an example of the lighting device assembly, according to various embodiments.

FIG. 3A is a front perspective view of an example of a lighting device assembly 100*c*, according to various embodiments. FIG. 3B is a back perspective view of an example of the lighting device assembly 100*c*, according to various embodiments. FIG. 3C is a back view of an example of the lighting device assembly 100*c*, according to various embodiments. FIGS. 3D and 3E are side views of an example of the lighting device assembly 100*c*, according to various embodiments. FIG. 3F is an exploded view of an example of the lighting device assembly 100*c*, according to various embodiments. FIG. 3G is a cross-sectional view of section C-C (FIG. 3C) of an example of the lighting device assembly 100*c*, according to various embodiments. The lighting device assembly 100*c* is similar to the lighting device assembly 100*a* in various aspects as readily apparent from the figures, with the differences described herein. For example, the collar 113 of the lighting device assembly 100*c* has a generally irregular shape rather than a circular shape of the collar 113 of the lighting device assembly 100*a*.

Figure 4:
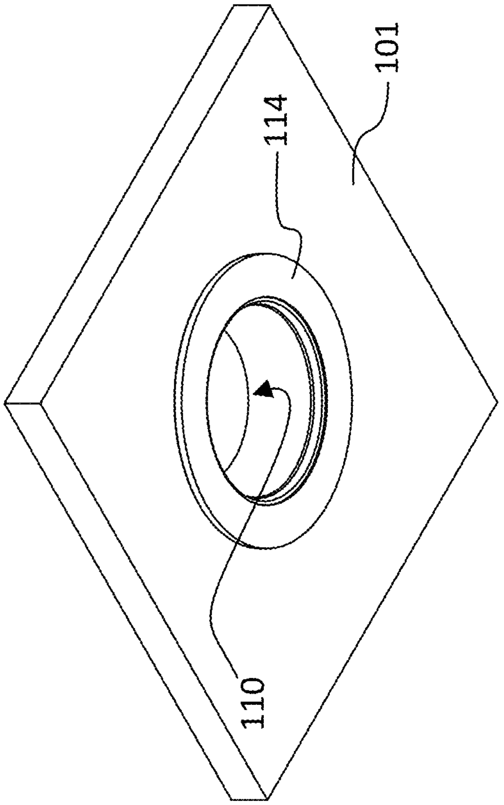
FIG. 4 is a perspective front view of a portion of an example lighting device assembly exposed from the panel, according to various embodiments.

FIG. 4 is a perspective front view of a portion of an example lighting device assembly 100*a*, 100*b*, or 100*c* exposed from the panel 101, according to various embodiments. As shown, exposed from the panel 101 are the trim member 114 and the light device assembly 110.

Figure 5:
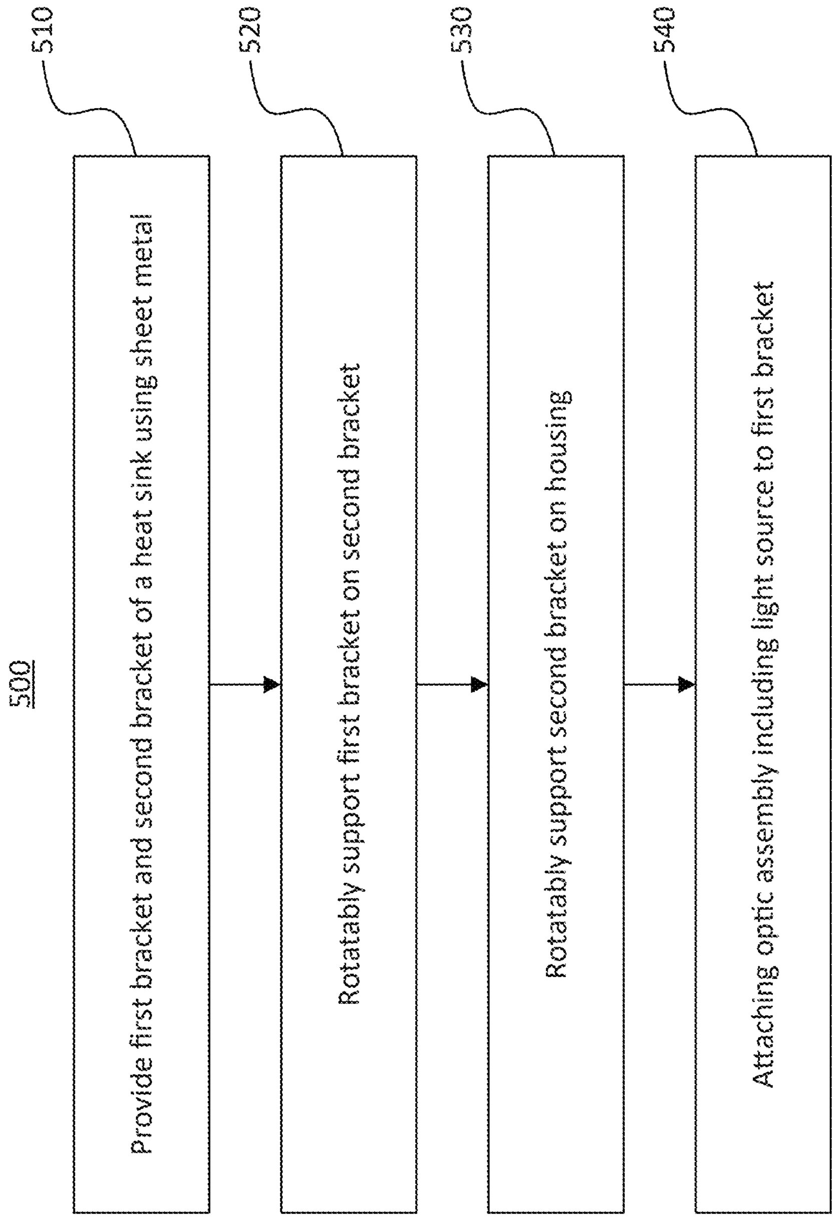
FIG. 5 is a flowchart diagram illustrating an example method for providing an example lighting device assembly, according to various arrangements.

FIG. 5 is a flowchart diagram illustrating an example method 500 for providing an example lighting device assembly 100*a*, 100*b*, or 100*c*, according to various arrangements. At 510, the first bracket 151 and the second bracket 152 of the heat sink 150 is provided (e.g., manufactured) using a sheet metal. A portion of the sheet metal has a thickness of at least 3 mm. In some examples, the sheet metal is bent and cut to form the structures of the first bracket 151 and the second bracket 152. At 520, the first bracket 151 is rotatably supported on the second bracket 152 in the manner described. At 530, the second bracket 152 is rotatably supported on the housing 120 in the manner described. At 540, the optic assembly 110 including the light source 111 is attached to the first bracket 151.

In the drawings, the relative sizes of elements, layers, and regions can be exaggerated and/or simplified for clarity. Spatially relative terms, such as “beneath,” “below,” “lower,” “under,” “above,” “upper,” and the like, can be used herein for ease of explanation to describe one element or feature’s relationship to another element(s) or feature(s)

as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device can be otherwise oriented (e.g., rotated 90 degrees or at other orientations) and the spatially relative descriptors used herein should be interpreted accordingly.

It will be understood that, although the terms "first," "second," "third," etc., can be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," "coupled to," "secured to" or "attached to" another element or feature, it can be directly on, connected to, coupled to, secured to or attached to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," "generally" and similar terms are used as terms of approximation and not as terms of degree, and are intended to account for the inherent variations in measured or calculated values that would be recognized by those of ordinary skill in the art. Further, the use of "can" when describing embodiments of the present invention refers to "one or more embodiments of the present invention." As used herein, the terms "use," "using," and "used" can be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing description of illustrative embodiments has been presented for purposes of illustration and of description. It is not intended to be exhaustive or limiting, and modifications and variations can be possible in light of the above teachings or can be acquired from practice of the disclosed embodiments. Various modifications and changes that come within the meaning and range of equivalency of the claims are intended to be within the scope of the invention. Thus, while certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A lighting device assembly, comprising:

an optic assembly comprising a light source;

a housing comprising a cavity in which the at least a portion of the optic assembly is received, wherein the housing is configured to secure the lighting device assembly to a wall, a ceiling, or a surface;

a heat sink configured to couple the optic assembly to an opening of the housing that defines the cavity, wherein the heat sink comprises a hinged aiming mechanism configured to movably couple the optic assembly to the housing to allow the light source to move relative to the housing, wherein the hinged aiming mechanism of the heat sink comprises:

a first bracket supporting a first movement relative to the housing; and a second bracket supporting a second movement relative to the housing, the first movement comprises a first rotational movement about a first axis, and the second movement comprises a second rotational movement about a second axis.

2. The lighting device assembly of claim 1, wherein the heat sink comprises a sheet metal.

3. The lighting device assembly of claim 2, wherein a thickness of at least a portion of the sheet metal is at least 3 mm.

4. The lighting device assembly of claim 2, wherein a thickness of at least a portion of the sheet metal is within a range of 2-6 mm.

5. The lighting device assembly of claim 1, wherein a thermal conductivity of the heat sink is at least 80 W/MK.

6. The lighting device assembly of claim 1, wherein the heat sink is made from aluminum.

7. The lighting device assembly of claim 1, wherein the heat sink is made from at least one of 6061 aluminum, metal alloys containing not less than 70% aluminum, metal alloys containing not less than 70% copper.

8. The lighting device assembly of claim 1, wherein the first axis and the second axis are perpendicular to one another.

9. The lighting device assembly of claim 1, wherein the first bracket is rotatably supported by the second bracket; and the second bracket is rotatably supported by the housing.

10. A lighting device assembly, comprising:

an optic assembly comprising a light source;

a housing comprising a cavity in which the at least a portion of the optic assembly is received, wherein the housing is configured to secure the lighting device assembly to a wall, a ceiling, or a surface;

a heat sink configured to couple the optic assembly to an opening of the housing that defines the cavity, wherein the heat sink comprises a hinged aiming mechanism configured to movably couple the optic assembly to the housing to allow the light source to move relative to the housing, wherein the hinged aiming mechanism of the heat sink comprises:

a first bracket supporting a first movement relative to the housing; and a second bracket supporting a second movement relative to the housing, wherein the second bracket comprises a collar to engage a groove located at or adjacent to the opening of the housing, at least a portion of the optic assembly is exposed through the opening, the collar is to rotate along the groove.

11. The lighting device assembly of claim 10, wherein the second bracket comprises an engagement portion extending from the collar, the engagement portion to rotatably engage the first bracket.

12. The lighting device assembly of claim 11, wherein the engagement portion extends inward from the opening of the housing into the cavity.

13. A lighting device assembly, comprising:

an optic assembly comprising a light source;

a housing comprising a cavity in which the at least a portion of the optic assembly is received, wherein the housing is configured to secure the lighting device assembly to a wall, a ceiling, or a surface;

a heat sink configured to couple the optic assembly to an opening of the housing that defines the cavity, wherein the heat sink comprises a hinged aiming mechanism configured to movably couple the optic assembly to the housing to allow the light source to move relative to the housing, wherein the hinged aiming mechanism of the heat sink comprises:

a first bracket supporting a first movement relative to the housing; and a second bracket supporting a second movement relative to the housing, wherein the first bracket comprises a middle portion and at least one side portion supporting the middle portion;

the middle portion extends over the optics assembly; and the at least one side portion is rotatably coupled to the second bracket.

14. The lighting device assembly of claim 13, wherein the at least one side portion comprises two side portions on either side of the middle portion; and the two side portions are rotatably coupled to the second bracket.

15. The lighting device assembly of claim 14, wherein the two side portions and the middle portion form an arched shape defining a space configured to accommodate at least a portion of the optic assembly.

16. A lighting device assembly, comprising:

an optic assembly comprising a light source;

a housing comprising a cavity in which the at least a portion of the optic assembly is received, wherein the housing is configured to secure the lighting device assembly to a wall, a ceiling, or a surface;

a heat sink configured to couple the optic assembly to an opening of the housing that defines the cavity, wherein the heat sink comprises a hinged aiming mechanism configured to movably couple the optic assembly to the housing to allow the light source to move relative to the housing, wherein the hinged aiming mechanism of the heat sink comprises:

a first bracket supporting a first movement relative to the housing; and a second bracket supporting a second movement relative to the housing, wherein the first bracket transfers heat from the light source to the cavity of the housing by radiating heat from the light source toward the cavity of the housing; and the first bracket transfer heat from the light source to the second bracket by conduction.

* * * * *